(12) United States Patent
Moses et al.

(10) Patent No.: US 10,542,738 B2
(45) Date of Patent: Jan. 28, 2020

(54) FISHING ROD DOCKING SYSTEM

(71) Applicant: Moses Outdoor Concepts, LLC., Riceville, TN (US)

(72) Inventors: Dan Wayne Moses, Riceville, TN (US); Neal Brian Moses, Athens, TN (US)

(73) Assignee: Moses Outdoor Concepts, LLC., Riceville, TN (US)

( * ) Notice: Subject to any disclaimer, the term of this patent is extended or adjusted under 35 U.S.C. 154(b) by 0 days.

(21) Appl. No.: 16/194,994

(22) Filed: Nov. 19, 2018

(65) Prior Publication Data

US 2019/0223424 A1 Jul. 25, 2019

Related U.S. Application Data

(60) Provisional application No. 62/619,317, filed on Jan. 19, 2018.

(51) Int. Cl.
*A01K 97/10* (2006.01)
*B63B 25/00* (2006.01)
*A47B 81/00* (2006.01)

(52) U.S. Cl.
CPC ............ *A01K 97/10* (2013.01); *A47B 81/005* (2013.01); *B63B 25/002* (2013.01)

(58) Field of Classification Search
CPC ........ A01K 97/01; A01K 97/08; A01K 97/10; B63B 25/002; A47B 81/005
USPC .......... 211/70.8, 68, 64, 60.1; 114/255, 343, 114/346, 364, 218; 248/225.11, 224.8, 248/223.41, 220.21, 220.22; 43/21.2, 43/54.1; 224/922; 206/315.11
See application file for complete search history.

(56) References Cited

U.S. PATENT DOCUMENTS

| | | | | | |
|---|---|---|---|---|---|
| 1,418,093 | A | * | 5/1922 | Parmater ................ | A63B 55/10 211/15 |
| 2,555,073 | A | * | 5/1951 | Zdankoski ............. | A01K 97/22 43/55 |
| 2,576,624 | A | * | 11/1951 | Miller ..................... | A01K 97/10 248/514 |
| 2,599,160 | A | * | 6/1952 | Brauer ................... | A01K 97/10 248/515 |
| 2,731,224 | A | * | 1/1956 | MacDonald ........... | A01K 97/10 248/511 |
| 2,750,088 | A | * | 6/1956 | Agostini ............... | A47B 81/005 224/275 |
| 2,783,896 | A | * | 3/1957 | Agostini ................... | B60R 7/14 211/64 |

(Continued)

*Primary Examiner* — Jonathan Liu
*Assistant Examiner* — Devin K Barnett
(74) *Attorney, Agent, or Firm* — Pitts & Lake, P.C.

(57) ABSTRACT

A fishing rod docking system including an elongated carrier member having a front end and a rear end, a rear rod holding member configured to be coupled to, and extend away from, a top surface of the carrier member proximate the rear end, and a front rod holding member configured to be coupled to, and extend away from, the top surface of the carrier member proximate the front end, wherein the rear and front rod holding members are each configured with a plurality of receiving slots such that each receiving slot provided on the rear rod holding member has a corresponding receiving slot provided on the front rod holding member, each pair of corresponding receiving slots configured to receive and hold a fishing rod extending therethrough.

13 Claims, 14 Drawing Sheets

(56) References Cited

U.S. PATENT DOCUMENTS

| | | | | |
|---|---|---|---|---|
| 2,881,817 A * | 4/1959 | Brion | F41B 5/063 206/315.11 |
| 2,899,155 A * | 8/1959 | Rogers | A01K 97/10 248/514 |
| 2,909,215 A * | 10/1959 | Mitchell | A01K 97/10 297/40 |
| 2,917,258 A * | 12/1959 | Furey | A01K 97/10 43/21.2 |
| 2,954,909 A * | 10/1960 | Miller | A01K 97/10 224/200 |
| 3,246,865 A * | 4/1966 | Latimer | A01K 97/10 248/515 |
| 3,266,633 A * | 8/1966 | Graebner | B60R 9/02 211/70.8 |
| 3,421,632 A * | 1/1969 | Wood | A47B 81/005 211/70.8 |
| 3,474,561 A * | 10/1969 | McConkey | A01K 97/01 43/16 |
| 3,487,947 A * | 1/1970 | Bogar, Jr. | A01K 97/08 211/70.8 |
| 3,628,204 A * | 12/1971 | Hoffman, Jr. | B63B 35/14 114/343 |
| 3,731,817 A * | 5/1973 | Fowlkes | A01K 97/08 211/70.8 |
| 3,876,076 A * | 4/1975 | Hazelhurst | A01K 97/08 211/4 |
| 3,921,868 A * | 11/1975 | Reichbach | B62J 9/00 224/454 |
| 4,003,612 A * | 1/1977 | Munsell | A01K 97/08 312/245 |
| 4,056,220 A * | 11/1977 | Trimble | B63B 35/73 224/406 |
| 4,073,328 A * | 2/1978 | Franklin | F41B 5/063 124/25.7 |
| 4,174,042 A * | 11/1979 | Fair | E05B 73/00 211/64 |
| 4,567,845 A * | 2/1986 | Smith | B63B 29/04 114/343 |
| 4,569,466 A * | 2/1986 | Webber | A01K 97/10 224/268 |
| 4,594,805 A * | 6/1986 | McClelland | A01K 97/10 248/520 |
| 4,628,628 A * | 12/1986 | Burgin | A01K 97/06 206/315.11 |
| D295,776 S * | 5/1988 | Johansen | 224/200 |
| 4,746,253 A * | 5/1988 | Simmons | A01K 97/12 43/17 |
| 4,753,029 A * | 6/1988 | Shaw | A01K 97/10 248/538 |
| 4,807,381 A * | 2/1989 | Southard | A47B 81/005 211/64 |
| 4,843,994 A * | 7/1989 | Wilson | B63B 59/02 114/219 |
| 4,856,221 A * | 8/1989 | Thompson | A01K 97/10 43/21.2 |
| 4,873,777 A * | 10/1989 | Southard | A47B 81/005 42/94 |
| 4,901,469 A * | 2/1990 | Murray | A01K 91/08 43/21.2 |
| 4,901,970 A * | 2/1990 | Moss | A01K 97/10 224/282 |
| 4,908,973 A * | 3/1990 | Perks | A01K 97/10 43/15 |
| 4,928,419 A * | 5/1990 | Forrestal | A01K 97/01 43/17 |
| D310,302 S * | 9/1990 | Southard | 211/163 |
| 5,005,509 A * | 4/1991 | Williams | B63B 17/00 114/343 |
| 5,014,458 A * | 5/1991 | Wagner | A01K 97/10 43/21.2 |
| 5,024,018 A * | 6/1991 | Ferrigno | A01K 97/10 224/200 |
| 5,040,324 A * | 8/1991 | Rivera | A01K 97/08 224/250 |
| 5,058,302 A * | 10/1991 | Minneman | F41A 23/18 206/315.11 |
| 5,071,048 A * | 12/1991 | Price | A01K 97/08 224/247 |
| 5,137,319 A * | 8/1992 | Sauder | A01K 97/10 206/315.11 |
| 5,152,494 A * | 10/1992 | Frunzar | A01K 97/08 248/513 |
| 5,307,585 A * | 5/1994 | Thompson | A01K 97/10 211/70.7 |
| 5,450,688 A * | 9/1995 | Hall | A01K 97/08 206/315.11 |
| 5,551,183 A * | 9/1996 | Solem | A01K 97/01 43/17 |
| 5,586,515 A * | 12/1996 | Nickles | A01K 97/08 114/255 |
| 5,625,973 A * | 5/1997 | Anthony | A01K 97/08 211/70.8 |
| 5,632,427 A * | 5/1997 | Gattuso | A01K 97/10 211/70.8 |
| 5,640,944 A * | 6/1997 | Minneman | F41B 5/14 124/1 |
| 5,678,348 A * | 10/1997 | Zielinski | A01K 97/08 211/70.8 |
| 5,845,891 A * | 12/1998 | West | A01K 97/10 248/538 |
| 5,860,573 A * | 1/1999 | Hossack | B60R 7/06 211/64 |
| 5,901,890 A * | 5/1999 | Stokes | A01K 97/10 114/343 |
| 5,913,673 A * | 6/1999 | Womac | A01K 97/10 43/21.2 |
| 5,950,556 A * | 9/1999 | Liebe | B63B 21/08 114/218 |
| 5,975,002 A * | 11/1999 | Rieger | B63B 35/14 114/343 |
| 5,979,101 A * | 11/1999 | Muenchow | A01K 97/01 43/17 |
| 5,979,102 A * | 11/1999 | Sagryn | A01K 97/08 114/364 |
| 5,988,094 A * | 11/1999 | Obrinski | B63B 17/00 114/218 |
| 5,992,717 A * | 11/1999 | Clewes | A01K 97/10 224/200 |
| 5,996,527 A * | 12/1999 | Ambrozic | A01K 97/10 114/347 |
| 6,036,067 A * | 3/2000 | Alcorn | A01K 77/00 206/315.11 |
| 6,089,652 A * | 7/2000 | Miller, Sr. | A01K 97/10 297/326 |
| 6,186,087 B1 * | 2/2001 | Vinas | B63B 25/002 114/343 |
| 6,267,425 B1 * | 7/2001 | Dorsey | A01K 97/08 211/70.8 |
| 6,269,990 B1 * | 8/2001 | Gray | A01K 97/10 224/200 |
| 6,471,103 B1 * | 10/2002 | Frese | A01K 97/08 206/249 |
| 6,591,541 B1 * | 7/2003 | Cummings | A01K 97/10 248/514 |
| 6,591,542 B1 * | 7/2003 | Jordan | A01K 97/10 224/922 |
| 6,637,707 B1 * | 10/2003 | Gates | A47B 81/005 211/64 |
| 6,659,316 B2 * | 12/2003 | Fleming | F41B 13/04 224/0.5 |
| 6,910,592 B1 * | 6/2005 | Lindenmeyer | A47B 81/005 211/60.1 |
| 7,051,471 B1 * | 5/2006 | Ausborne, Jr. | A01K 97/06 206/315.11 |
| 8,181,381 B1 * | 5/2012 | Kelleher | A01K 97/10 224/200 |
| 8,516,973 B1 * | 8/2013 | Hamilton | B63H 20/06 114/347 |

(56) References Cited

U.S. PATENT DOCUMENTS

| | | | | |
|---|---|---|---|---|
| 8,746,469 B1* | 6/2014 | De La Torre | ............. | B60R 9/08 211/70.8 |
| 8,783,748 B1* | 7/2014 | Quinn | .................... | A01K 97/08 211/70.8 |
| 8,875,963 B2* | 11/2014 | Knutson | ................ | A01K 97/08 224/405 |
| 9,179,657 B1* | 11/2015 | Winter | ................ | A01K 91/065 |
| 9,586,657 B1* | 3/2017 | Dykes | .................... | A01K 97/10 |
| 2004/0108235 A1* | 6/2004 | Lukas | ...................... | F41A 35/00 206/315.11 |
| 2004/0118031 A1* | 6/2004 | Nielson | .................. | A01K 97/01 43/21.2 |
| 2004/0187760 A1* | 9/2004 | Eck | ....................... | B63B 27/143 114/343 |
| 2005/0223963 A1* | 10/2005 | Mataya | .................... | B63B 9/06 114/343 |
| 2006/0207161 A1* | 9/2006 | Lynn | ...................... | A01K 97/08 43/21.2 |
| 2006/0237501 A1* | 10/2006 | Gonzalez | ................ | A01K 97/08 224/325 |
| 2007/0169396 A1* | 7/2007 | O'Neill | .................. | A01K 97/08 43/21.2 |
| 2007/0278166 A1* | 12/2007 | Morton | .................. | A01K 97/08 211/70.8 |
| 2010/0075550 A1* | 3/2010 | Bortsov | .................. | B63B 35/73 440/26 |
| 2010/0158605 A1* | 6/2010 | Gargaro, III | ........... | A01K 97/10 403/336 |
| 2010/0242828 A1* | 9/2010 | Gratsch | ................... | B63B 17/00 114/364 |
| 2010/0299988 A1* | 12/2010 | Robinson | ............... | A01K 97/01 43/21.2 |
| 2011/0083355 A1* | 4/2011 | Wilcox | .................. | A01K 91/08 43/27.4 |
| 2011/0163214 A1* | 7/2011 | Tages | ..................... | F16M 13/04 248/220.21 |
| 2011/0314722 A1* | 12/2011 | Kemper | ................. | A01K 97/10 43/21.2 |
| 2012/0037579 A1* | 2/2012 | Muldoon | ............... | A01K 97/08 211/64 |
| 2012/0125306 A1* | 5/2012 | Kempf | .................... | F41B 5/066 124/88 |
| 2013/0055621 A1* | 3/2013 | Fong | ...................... | A01K 97/10 43/21.2 |
| 2013/0233233 A1* | 9/2013 | Ricci | ...................... | B63H 16/20 114/343 |
| 2013/0306506 A1* | 11/2013 | Fraser | .................... | A01K 97/08 206/315.11 |
| 2014/0125075 A1* | 5/2014 | Xiques | .................. | A01K 97/08 294/143 |
| 2014/0332655 A1* | 11/2014 | Colbert | .................. | A01K 97/10 248/512 |
| 2015/0182020 A1* | 7/2015 | Rahman | .................... | B60R 7/14 211/64 |
| 2015/0201601 A1* | 7/2015 | Honermann | ........... | A01K 97/01 211/70.8 |
| 2016/0374323 A1* | 12/2016 | Bernardini | ................ | A45F 3/02 224/257 |
| 2017/0367311 A1* | 12/2017 | Zale | ...................... | A01K 97/10 |
| 2018/0070573 A1* | 3/2018 | Harris | ...................... | B60R 9/08 |
| 2018/0110332 A1* | 4/2018 | Nye | ...................... | A47B 81/005 |
| 2019/0045922 A1* | 2/2019 | Jacobs | .................. | A01K 97/10 |

\* cited by examiner

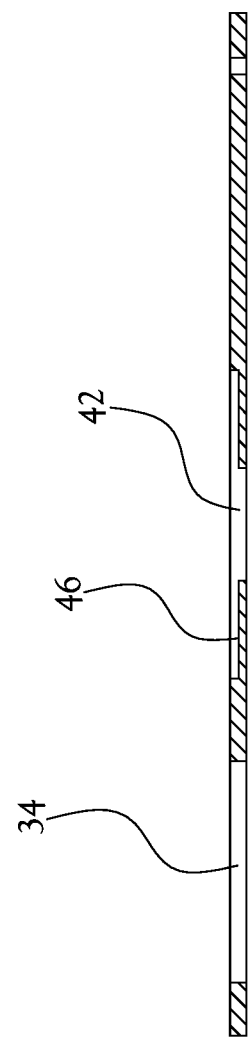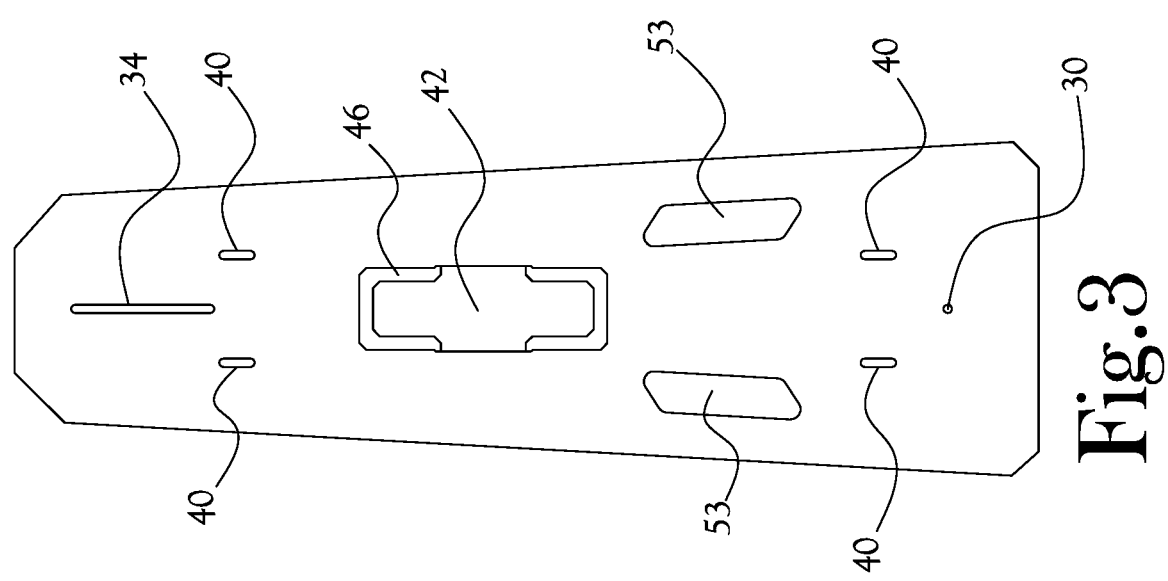

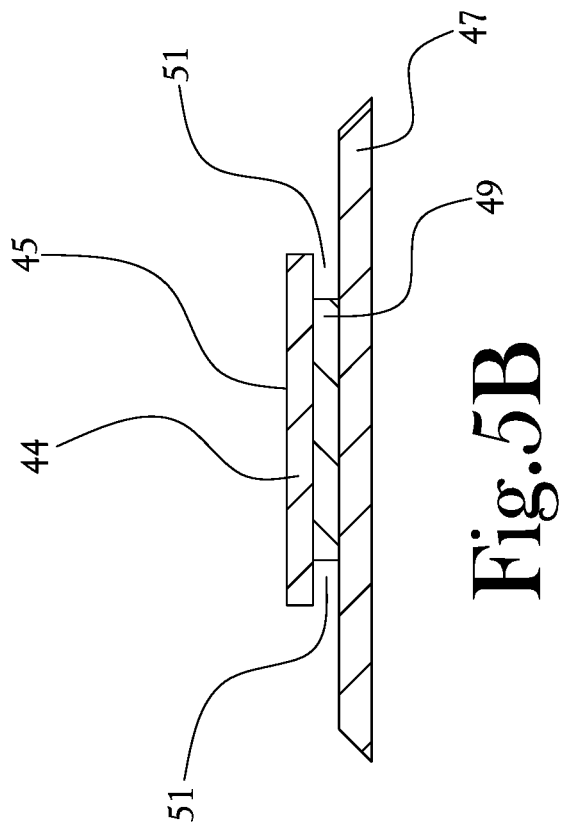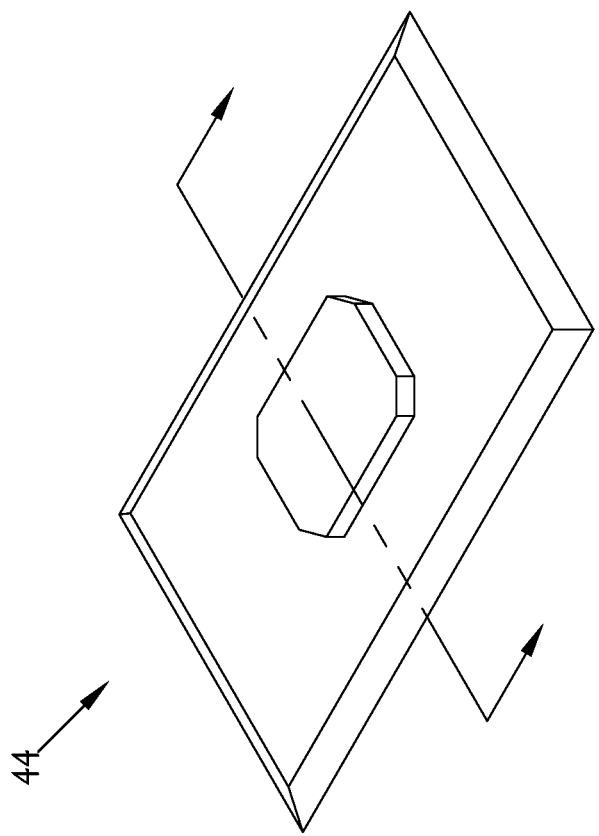
Fig.5B
Fig.5A

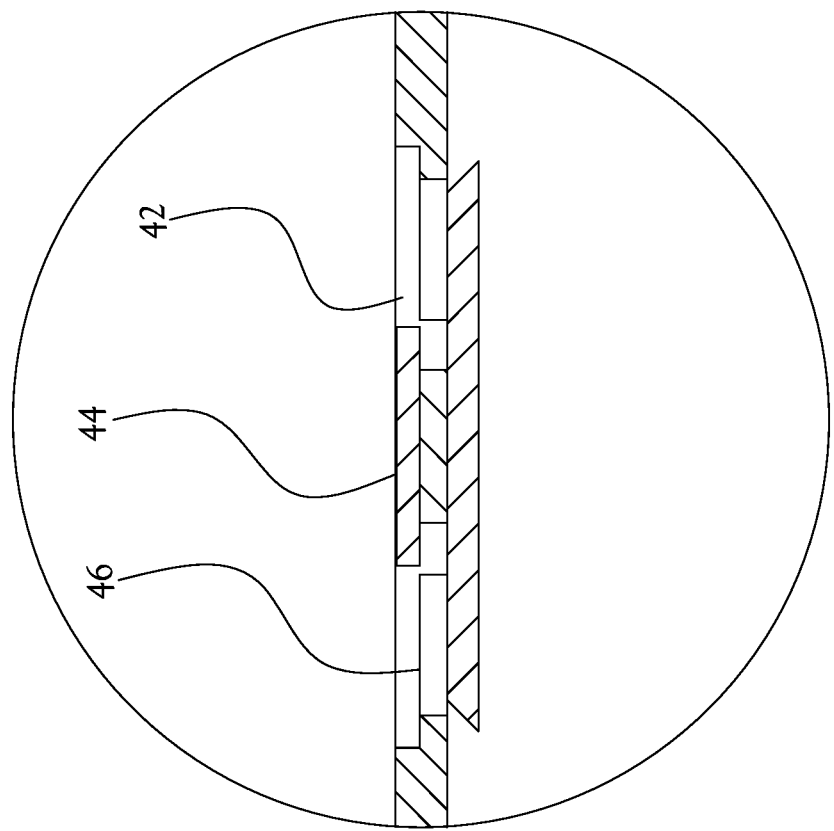
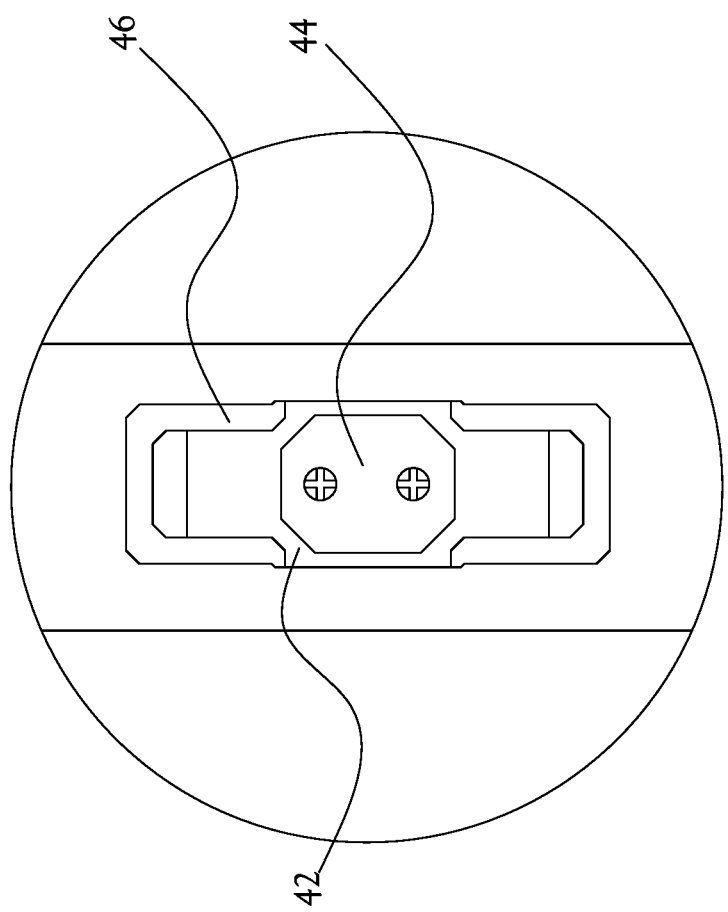
Fig.6B
Fig.6A

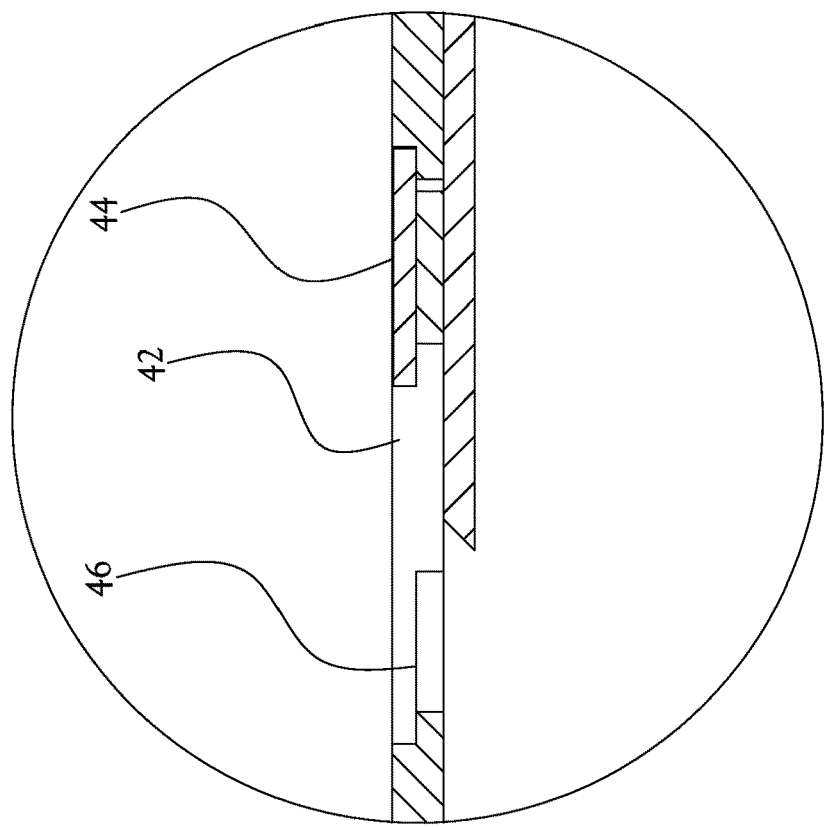
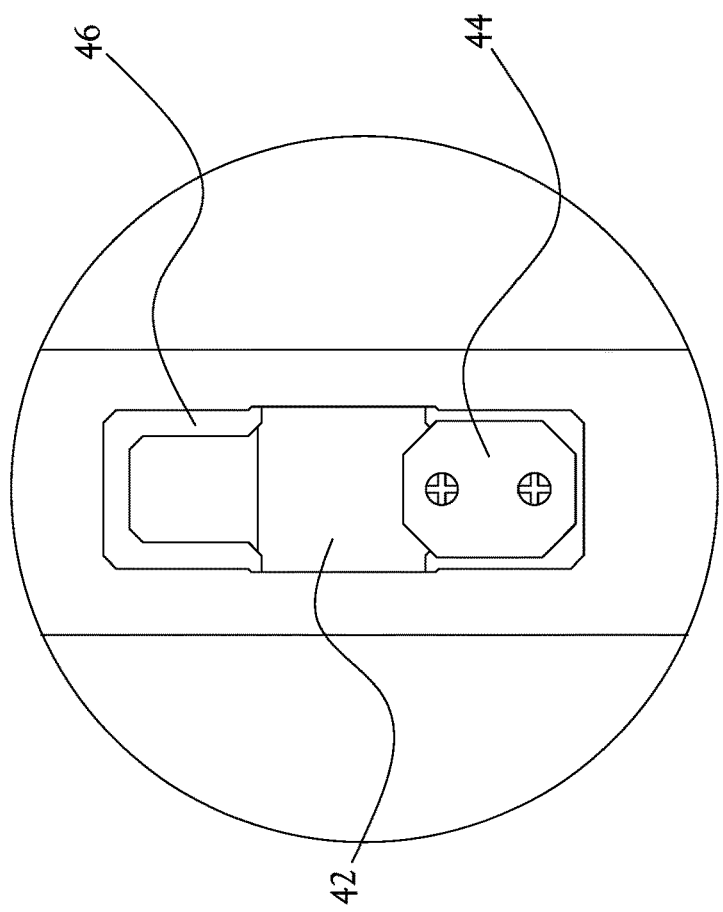
Fig.7B
Fig.7A

FISHING ROD DOCKING SYSTEM

CROSS-REFERENCE TO RELATED APPLICATIONS

This application claims the benefit of U.S. Provisional Patent Application Ser. No. 62/619,317, filed on Jan. 19, 2018, which is incorporated herein in its entirety by reference.

FIELD OF INVENTION

The present general inventive concept relates to fishing accessories, and, more particularly, a fishing rod docking system to improve the accessibility of multiple fishing rods while fishing, and to move the multiple fishing rods in a stored condition from boat to home, or vice versa, with ease.

BACKGROUND

Fishermen often prefer to have multiple fishing rods to choose from during fishing expeditions, especially when those expeditions are of longer durations. Having multiple fishing rods allows a fisherman to choose specific rod setups for different conditions, different target fish, different bait, etc. Some fishermen even consider it necessary to have multiple rods due to rapidly changing fishing conditions. However, having multiple fishing rods available on the deck of a fishing boat typically leads to a situation in which the multiple rods are clustered together on the floor of the boat. Such an arrangement results in fishing rods which can be easily stepped on and broken or otherwise damaged, get tangled with one other, get in the way of the fishing rod currently wielded by the fisherman, etc. Another problem is that the movement of the multiple fishing rods from the home/garage to the boat, and then back, can be cumbersome and frustrating.

Conventionally, the use of a rod locker is the primary method of storing fishing rods and gear practiced by most fishermen. A rod locker, in its simplest form, is a box that the rods are placed in that is typically designed and built into the boat. Rod lockers are not ready accessible to the fisherman as he or she fishes. And, as previously stated, if one were to simply place the rods on the deck so they can be used as needed which, is the typical current way, then the rods are easily stepped on, and possibly broken or damaged in some other form. As also previously stated, rods haphazardly laid on the deck also are apt to get tangled up with each other quite easily, which prevents the fisherman from being able to access and use one of them quickly.

Therefore, there exists a need for a way to store multiple fishing rods that will enable a fisherman to conveniently access different ones of the multiple fishing rods while fishing, and to move the same multiple fishing rods in a convenient way from boat to home, or vice versa, with ease.

BRIEF SUMMARY

According to various example embodiments of the present general inventive concept, a fishing rod docking system is provided to enable a user to have accessibility of multiple fishing rods while fishing, and to move the same multiple fishing rods in a stored condition from boat to home, or vice versa, as herein described and disclosed.

Additional aspects and advantages of the present general inventive concept will be set forth in part in the description which follows, and, in part, will be obvious from the description, or may be learned by practice of the present general inventive concept.

The foregoing and/or other aspects and advantages of the present general inventive concept may be achieved by providing a fishing rod docking system including an elongated carrier member having a front end and a rear end, a rear rod holding member configured to be coupled to, and extend away from, a top surface of the carrier member proximate the rear end, and a front rod holding member configured to be coupled to, and extend away from, the top surface of the carrier member proximate the front end, wherein the rear and front rod holding members are each configured with a plurality of receiving slots such that each receiving slot provided on the rear rod holding member has a corresponding receiving slot provided on the front rod holding member, each pair of corresponding receiving slots configured to receive and hold a fishing rod extending therethrough.

The foregoing and/or other aspects and advantages of the present general inventive concept may also be achieved by providing a fishing rod docking system including a rear rod holding member configured to be coupled to a slider track accessory rail, a front rod holding member configured to be coupled to the slider track accessory rail, wherein the rear and front rod holding members are each configured with a plurality of receiving slots such that each receiving slot provided on the rear rod holding member has a corresponding receiving slot provided on the front rod holding member, each pair of corresponding receiving slots configured to receive and hold a fishing rod extending therethrough when the rear and front rod holding members are positioned to face one another in a substantially parallel arrangement.

Other features and aspects may be apparent from the following detailed description, the drawings, and the claims.

BRIEF DESCRIPTION OF THE FIGURES

The following example embodiments are representative of example techniques and structures designed to carry out the objects of the present general inventive concept, but the present general inventive concept is not limited to these example embodiments. In the accompanying drawings and illustrations, the sizes and relative sizes, shapes, and qualities of lines, entities, and regions may be exaggerated for clarity. A wide variety of additional embodiments will be more readily understood and appreciated through the following detailed description of the example embodiments, with reference to the accompanying drawings in which:

FIG. 3 illustrates a top view of the carrier board of the fishing rod docking system illustrated in FIG. 1;

FIG. 4 illustrates a cross section view of the carrier board of the fishing rod docking system illustrated in FIG. 1;

FIGS. 5A-B illustrate a perspective view and cross section of the mounting member of FIG. 2 according to an example embodiment of the present general inventive concept;

FIGS. 6A-B and 7A-B illustrate a mounting procedure of the carrier board and mounting member of FIG. 2;

DETAILED DESCRIPTION

Reference will now be made to the example embodiments of the present general inventive concept, examples of which are illustrated in the accompanying drawings and illustrations. The example embodiments are described herein in order to explain the present general inventive concept by referring to the figures.

The following detailed description is provided to assist the reader in gaining a comprehensive understanding of the structures and fabrication techniques described herein. Accordingly, various changes, modification, and equivalents of the structures and fabrication techniques described herein will be suggested to those of ordinary skill in the art. The progression of fabrication operations described are merely examples, however, and the sequence type of operations is not limited to that set forth herein and may be changed as is known in the art, with the exception of operations necessarily occurring in a certain order. Also, description of well-known functions and constructions may be simplified and/or omitted for increased clarity and conciseness.

Note that spatially relative terms, such as "up," "down," "right," "left," "beneath," "below," "lower," "above," "upper" and the like, may be used herein for ease of description to describe one element or feature's relationship to another element(s) or feature(s) as illustrated in the figures. Spatially relative terms are intended to encompass different orientations of the device in use or operation in addition to the orientation depicted in the figures. For example, if the device in the figures is turned over or rotated, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

According to various example embodiments of the present general inventive concept, a fishing rod docking system is provided that allows for organized and secure fishing rod storage on a boat, that also allows the same organized and secure storage at home or some other off boat location, and that also provides easy and convenient transportation of the organized and securely stored fishing rods between the boat and the off boat storage location. Various example embodiments of the present general inventive concept provide such a fishing rod docking system that enables easy accessibility of the multiple fishing rods while fishing, and also when in a stored condition in the home or other off boat storage location.

Figure 1:
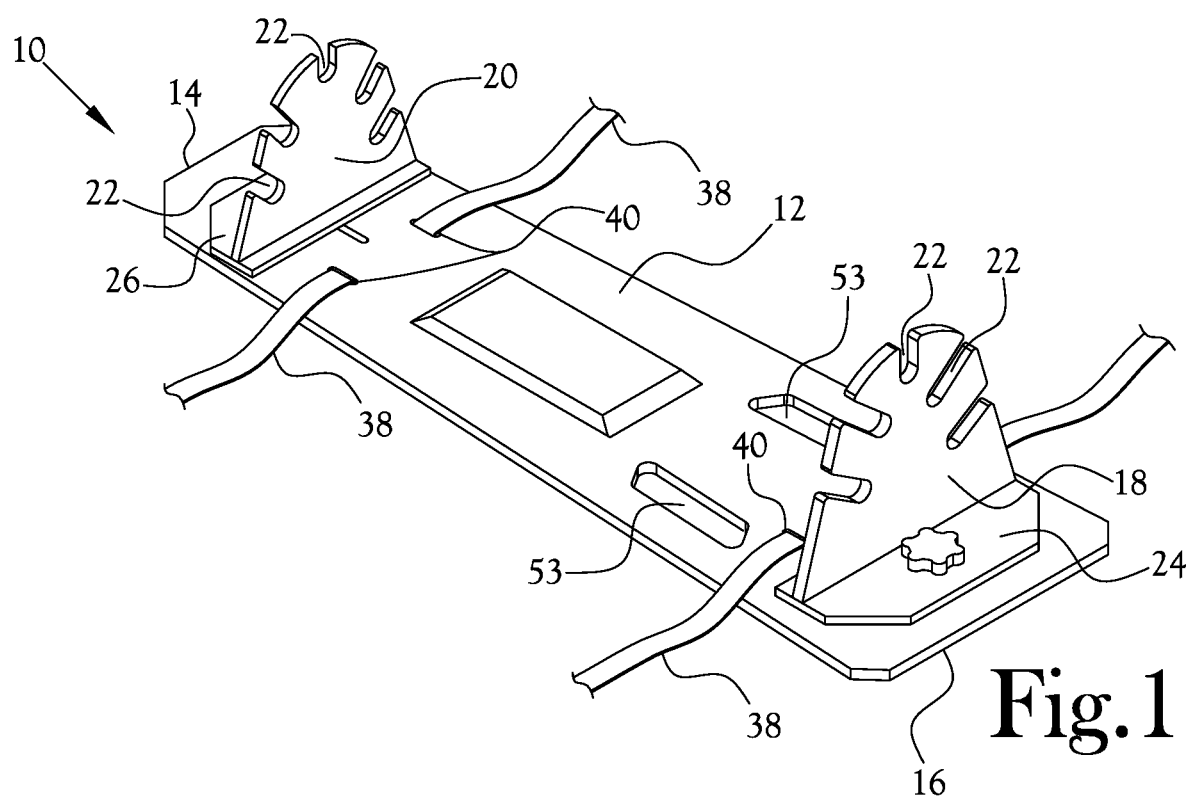
FIG. 1 illustrates a fishing rod docking system according to an example embodiment of the present general inventive concept.
Figure 2:
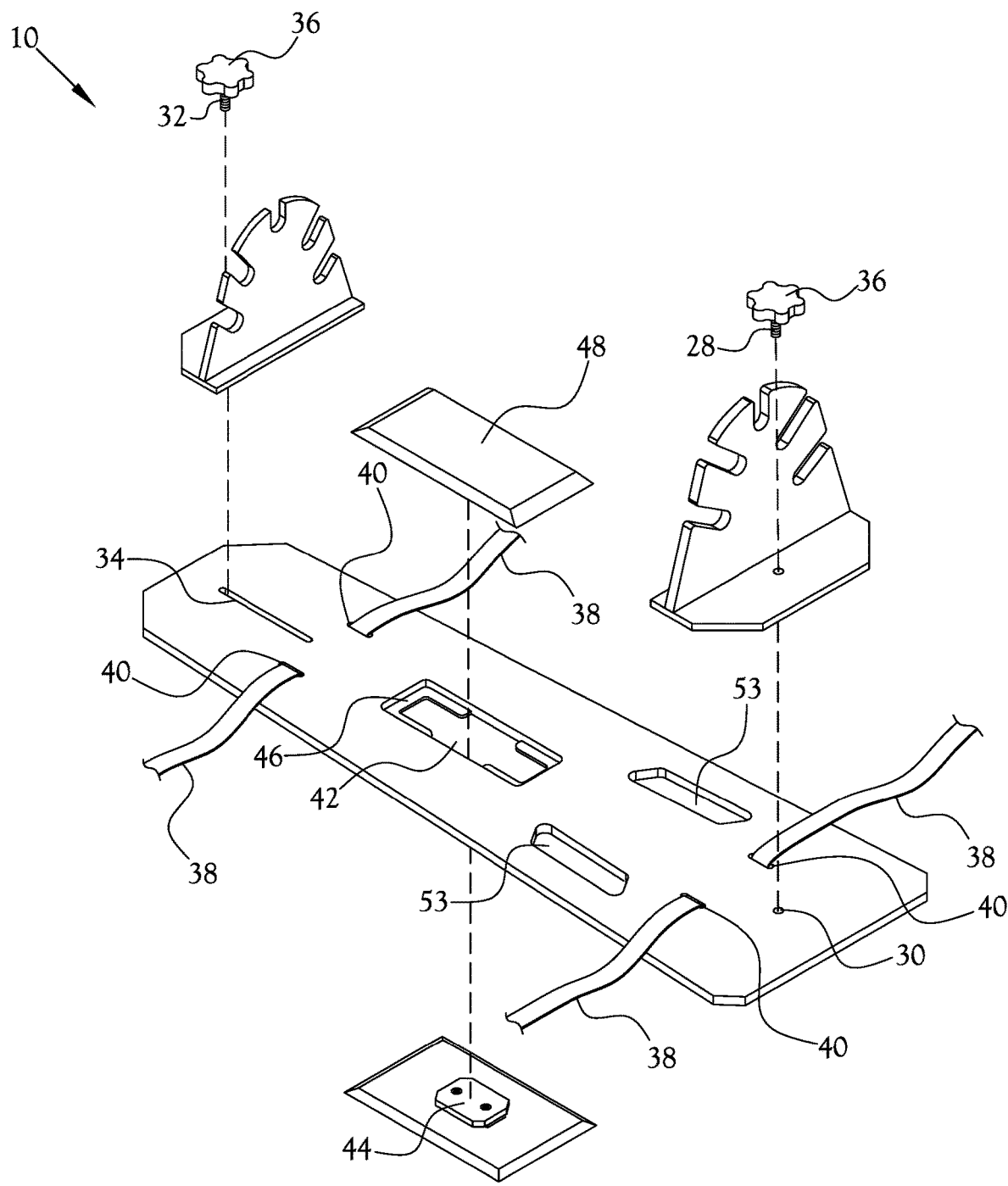
FIG. 2 illustrates an exploded view of the fishing rod docking system illustrated in FIG. 1.

FIG. 1 illustrates a fishing rod docking system according to an example embodiment of the present general inventive concept, and FIG. 2 illustrates an exploded view of the fishing rod docking system illustrated in FIG. 1. It is understood that other various example embodiments may include more or fewer components than those illustrated in FIGS. 1-2, as well as in different configurations, without departing from the scope of the present genera inventive concept. In the example fishing rod docking system 10 illustrated in FIGS. 1-2, an elongated carrier member 12, which may be referred to herein as a carrier board 12, is provided as a base for the fishing rod docking system 10. However, carrier members of other various example embodiments may be of vastly different sizes, and/or may not have a general board configuration like the example illustrated in FIGS. 1-2. The carrier board 12 of FIGS. 1-2 has a front end 14 and a rear end 16, and is configured to be a base used to mount the fishing rod docking system 10 on a boat mount and a wall mount for storage away from the boat, as well as a convenient carrying board for a user to transport the fishing rod docking system 10 and any fishing rods stored thereon in between destinations. A rear rod holding member 18 and a front rod holding member 20 are provided on an upper surface of the carrier board 12, and are arranged in operative alignment to secure a plurality of fishing rods in the docking system 10. The rear rod holding member 18 is coupled to the carrier board 12 proximate the rear end 16, and the front rod holding member 20 is coupled to the carrier board 12 proximate the front end 14. The rear and front rod holding members 18,20 are arranged so as to extend upward from the upper surface of the carrier board 12, and may extend substantially perpendicularly from the carrier board 12. The rear and front rod holding members 18,20 are each provided with a plurality of receiving slots 22 configured to hold fishing rods therein. The receiving slots 22 are arranged such that each receiving slot 22 on one of the rod holding members has a corresponding receiving slot 22 on the other of the rod holding members so that the corresponding pair of receiving slots 22 cooperate to hold different portions of the same fishing rod. In the example embodiment illustrated in FIGS. 1-2, the rear and front rod holding members 18,20 are formed as plates with arcuate perimeters extending from the carrier board 12, and the corresponding receiving slots 22 extend inward from the arcuate perimeters. As such, the rod holding members may be interchangeably referred to as rear and front rod holding plates 18,20 in some of the descriptions herein. However, in other various example embodiments the rear and front rod holding members may be formed in a variety of different ways, such as a more skeletal arrangement with receiving slots 22 formed on the ends of narrow members, as lattice-type arrangements formed to allow wind to pass through more easily, and so on.

In the example embodiment illustrated in FIGS. 1-2, the plurality of receiving slots 22 are formed so as to allow the portions of the rods received therein to be received as a slip fit, or otherwise arranged so that the rods are easily moved in and out of the receiving slots. In other words, the receiving slots 22 may be arranged such that fishing rods resting therein are simply held in place by gravity when the fishing rod docking system 10 is arranged in an upright manner with the carrier board 12 in a substantially horizontal arrangement. In such a configuration, the fishing rods may need to be held in place by one or more securing members that will hold the rods in the receiving slots 22, as will be described more thoroughly herein. In other various example embodiments of the present general inventive concept, the plurality of receiving slots 22 may be formed to provide a friction fit or a snap fit to hold the fishing rods in place when located therein. To provide such a fit, at least a portion of the rod holding plates that forms the receiving slots 22 may be formed of a pliable material that structurally deforms enough to allow the rods to be pushed into the receiving slots 22, but maintains a friction grip and also returns to the original shape when the rods are removed from the receiving slots 22. In various example embodiments, the receiving slots 22 may be formed in a rigid material that makes up the rest of the rod holding plates 18,20, and may be lined with a resiliently pliable material such as rubber, silicon, etc., to hold the rods in place. Also, although the receiving slots 22 illustrated in FIGS. 1-2 are formed as recesses with generally constant widths leading to a rounded terminus, and being at least partially angled upward or away from a horizontal plane shared by the carrier board 12, other example embodiments may employ a host of differently configured receiving slots. For example, the receiving slots 22 may be formed with a rounded terminus having a substantially round shape with a diameter larger than a width of the length of the slot leading to the terminus of the receiving slot. In other various example embodiments the receiving slots may be formed simply as semi-circular recesses near the arcuate perimeter of the rod holding plates 18,20. In various example embodiments in which the receiving slots are configured to have a friction fit or other type of fitting to secure the rods therein, the receiving slots may not need to be angled upward from the plane of the carrier board 12.

In the example embodiment illustrated in FIGS. 1-2, the rear and front rod holding plates 18,20 are coupled to the carrier board 12 by respective rear and front rod holding member supports 24,26 that extend laterally from the respective bottoms of the rear and front rod holding plates 18,20. The rear and front rod holding member supports 24,26 are arranged to lie substantially flat on the carrier board 12, thus holding the rear and front rod holding members 18,20 in a substantially vertical position relative to the horizontal carrier board 12. The rear rod holding member support 24 has a through hole through which a fixing member 28, which may be referred to herein as a fixing screw, bolt, etc., passes to be received in a rear pivot hole 30 formed in the carrier board 12 proximate the rear end 16. The fixing bolt 28 is provided with an adjustment handle 36 so that a user can easily tighten the fixing bolt 28 to hold the rear rod holding plate 18 on the carrier board. Also, because of the arrangement of the rear rod holding member support 24 cooperating with the fixing bolt 28, the rear rod holding plate 18 can be rotated or pivoted around the rear pivot hole 30 to the desired orientation. Thus, the user can simply loosen the fixing bolt 28, rotate the rear rod holding plate 18, and then screw the fixing bolt 28 back tight to hold the rear rod holding plate 18 in that position. The front rod holding member support 26 has a through hole through which a fixing member 32 (screw, bolt, etc.) passes to be received in a front pivot channel 34 formed in the carrier board 12 proximate the front end 14. Like the rear fixing member 28, the fixing bolt 32 is provided with an adjustment handle 36 so that a user can easily tighten the fixing bolt 32 to hold the front rod holding plate 20 on the carrier board, and to adjust the rotational orientation of the front rod holding plate 20. Also, because of the arrangement of the front pivot channel 34, the position of the front rod holding plate 20 can be adjusted along the longitudinal axis of the carrier board 12, so that a user can shorten or lengthen the distance between the rear and front rod holding plates 18,20 as desired. Thus, while the rotational orientations of both of the rear and front rod holding plates 18,20 are easily adjustable by the user, the length between the rear and front rod holding plates 18,20 is also easily adjustable. In various other example embodiments the rear and front rod holding plates 18,20 may be in a fixed orientation relative to the carrier board 12, both rear and front rod holding plates 18,20 may have simple pivot holes around which the rotational orientations may be adjusted, both rear and front rod holding plates 18,20 may be provided with pivot channels running along a longitudinal axis and/or a lateral axis of the carrier board 12, or various other combinations may be provided.

As illustrated in FIGS. 1-2, this example embodiment of the fishing rod docket system may include two straps 38 provided to the carrier board 12 to secure the rods in place in the receiving slots 22 of the rear and front rod holding plates 18,20. In this example embodiment, the front and rear straps 38 are coupled to the carrier board 12 by being threaded through strap pathways 40 provided in the carrier board 12. In this example embodiment, two such strap pathways 40 are provided for each strap 38 such that a corresponding pair of strap pathways 40 for each strap 38 are arranged symmetrically about a longitudinal axis of the carrier board 12, and are sized so that the straps 38 can be threaded therethrough but still maintain their arrangement when not secured around the fishing rods. To secure one or more fishing rods in place in the docking system 10, the straps 38 may be simply secured around the fishing rods with sufficient tension that the fishing rods do not fall out of the receiving slots 22. Thus, even when the receiving slots 22 provide simply slip fits to the fishing rods, the docking system 10 can be picked up and carried without worry of the rods docked therein falling out of the receiving slots 22. In various example embodiments of the present general inventive concept, the straps may be secured around the fishing rods by a mechanical coupling such as VELCRO®, various types of buckles, tying, etc. Also, various example embodiments may provide straps 38 that are coupled or fixed to the carrier board 12 in ways other than the strap pathways illustrated in FIGS. 1-2. For example, one end of each of the respective straps may be permanently fixed to the carrier board 12 in a variety of ways. Different example embodiments of the present general inventive concept may provide more or fewer straps 38, as well as different types of straps or other securing devices. For example, in various example embodiments one of the straps may be secured with a buckle type connection, and another of the straps may be secured with VELCRO®. As illustrated in FIGS. 1-2, in this example embodiment the rear rod holding plate 18 is larger than the front rod holding plate 20, so that the fishing rods stored in the receiving slots 22 are arranged such that the front ends of the fishing rods are stored in a converging arrangement. This allows the system 10 to conserve space occupied by the front ends of the fishing rods, which do not have the reel equipment that typically requires more space at the rear end of the fishing rods. Thus, a line passing through a center of both of a pair of corresponding receiving slots 22 is angled inward moving from the rear rod holding plate 18 to the front rod holding plate 20.

Various example embodiments of the present general inventive concept provide a fishing rod docking system that is selectively mountable to one or more surfaces equipped with a corresponding mounting member. In the example embodiment illustrated in FIGS. 1-2, a mounting member receiving portion 42 is provided in the carrier board 12 and is configured to receive a corresponding mounting member 44 so as to securely mount the carrier board 12 to the mounting member 44. In this example embodiment, the mounting member 44 is formed to have a cross section that is substantially similar to the substantially T-shaped cross section of a cleat, and therefore may be interchangeably referred to in some of the descriptions herein as a mounting cleat or cleat 44. For example, the mounting cleat 44 may be formed such that a connecting portion between a base and an upper portion of the mounting cleat is narrower than the upper portion so as to form grooves under two opposing sides of the upper portion of the mounting cleat 44. In other example embodiments, the mounting cleat 44 may simply be formed with the aforementioned upper portion that is wider than a lower portion, and the grooves are formed between the upper portion and the surface to which the mounting cleat 44 is mounted, e.g., the deck or other portion of a boat. The mounting member receiving portion 42, or cleat receiving portion 42, of this example embodiment is provided with one or more ribs or flanges 46 extending from opposite sides of at least a portion of a perimeter of the cleat receiving portion 42 that are configured to be received in the grooves formed in the mounting cleat 44. Thus, as will be described in more detail later in this specification, the carrier board 12 can be easily mounted on the mounting cleat 44 by simply placing the carrier board 12 over the mounting cleat 44 so that the mounting cleat 44 is received in the cleat receiving portion 42, and then sliding the carrier board 12 in a direction such that the flanges 46 are received in the grooves of the mounting cleat 44 to secure the carrier board 12, and thus the fishing rod docking system 10, to the mounting cleat 44. In the example embodiment illustrated in FIGS. 1-2, a cleat cover plate 48 is provided over the cleat receiving portion 42 to cover the coupling members, effectively creating a cleat pocket to receive the mounting cleat 44. Various example embodiments of the present general inventive concept may provide a variety of different mounting configurations to mount the carrier board to a mounting member, such as, for example, a dovetail coupling connection, a key and lock connection, a mounting member with a groove on one side to mate with a mounting member receiving portion with a flange on one side, and so on. Various example embodiments may provide a tension coupling that is spring loaded and can be released with the press of a button that collapses tension placed on one or more flanges provided on either the mounting member or mounting member receiving portion. The fishing rod docking system 10 may be provided with a plurality of the mounting cleats 44 so that one of the mounting cleats can be affixed to a surface of a boat, another of the mounting cleats can be affixed to a wall at a user's home or storage space, another of the mounting cleats can be affixed to the user's automobile, and so on. Because the configuration of the mounting member receiving portion 42 of this example embodiment results in an otherwise flat bottom surface of the carrier board 12, the system 10 can be rested on any flat surface not having a mounting member without interference from the mounting member receiving portion 42. As illustrated in FIGS. 1-2, the carrier board 12 can also be provided with one or more carry handle cutouts 53 so that a user can easily transport the system 10 by simple inserting one or more fingers in the carry handle cutouts 53 to grip the carrier board 12. Various example embodiments of the present general inventive concept may have no carry handles, or a different quantity of carry handle cutouts, or one or more attached handles, or sling attachments, and so on.

FIG. 3 illustrates a top view of the carrier board of the fishing rod docking system illustrated in FIG. 1, and FIG. 4 illustrates a cross section view of the carrier board of the fishing rod docking system illustrated in FIG. 1. As illustrated in this example embodiment, the flanges 46 are formed so as to extend from most of the perimeter of the mounting cleat receiving portion 42, leaving an open space in the center thereof to receive the wide upper portion of the mounting cleat 44 therethrough so that the carrier board 12 can then be moved in a direction to slide at least a portion of the flanges 46 into the grooves formed in the mounting cleat 44. Various other example embodiments of the present general inventive concept may provide a host of other flange configurations. For example, the flanges 46 may be located at only one end of the mounting cleat receiving portion 42, and may only extend from one side of the mounting cleat receiving portion 42. The flanges 46 may be formed integrally with the carrier board 12, or may be attached thereto in a desired configuration. The flanges 46 may be formed of a different and/or more flexible material than the carrier board 12 to reduce wear on the coupling members when mounting and unmounting the carrier board 12 on the mounting cleat 44. Also, while FIG. 4 illustrated the flanges 46 extending from a bottom of the mounting cleat receiving portion 42, in other example embodiments the flanges 46 may extend from an upper or mid portion of the mounting cleat receiving portion 42.

FIGS. 5A-B respectively illustrate a perspective view and cross section of the mounting member 44 of FIG. 2 according to an example embodiment of the present general inventive concept. The mounting cleat 44 of this example embodiment is formed such that a connecting portion 49, extending between a base 47 and an upper portion 45 of the mounting cleat, is narrower than the base 47 and upper portion 45 so as to form grooves 51 under two opposing sides of the upper portion 45 of the mounting cleat 44. As previously described, the mounting cleat 44 of this example embodiment is configured such that the wide upper portion 45 can be easily received within the widest opening in the mounting cleat receiving portion 42, and the mounting cleat 44 is slidably engaged with the flanges 46 extending inwardly from the mounting cleat receiving portion 42 and received in the grooves 51. In the example embodiment illustrated in FIG. 5, the upper portion 45 of the mounting cleat 44 is attached to the connecting portion 49 and base 47 through a pair of screws, but other example embodiments may provide different attachment members and/or methods, and still other example embodiments may provide an integrally formed mounting cleat 44. While the example embodiment of the mounting cleat 44 illustrated in FIGS. 5A-B has an upper portion 45, a base 47, and a connecting portion 49, in still other example embodiments the base 47, which may be referred to as a backer block, backer base, etc., may be omitted so that the mounting cleat 44 is simply formed by a wide upper portion over a narrower connecting portion. In various example embodiments a mounting cleat not having a base may be more desirable for use on a boat deck, while a mounting cleat having a base may be more desirable for use on a wall or other home storage surface to minimize contact between the wall and the carrier board of the fishing rod docking system.

FIGS. 6A-B and 7A-B illustrate a mounting procedure of the carrier board 12 and mounting 44 member of FIG. 2. In FIGS. 6A-B, as previously described, the wide upper portion 45 of the mounting cleat 44 is received in the wide open portion of the mounting cleat receiving portion 42 which does not have any flanges 46 extending from the perimeter. In FIGS. 7A-B, the carrier board has been moved so that the flanges 46 are slid into the grooves 51 of the mounting cleat 44 so that the carrier board 12 is secured to the mounting cleat 44. The interaction or register of the flanges 46 in the grooves 51 of the mounting cleat 44 prevent movement of the carrier board in a direction perpendicular to the carrier board 12 and mounting cleat 44, and the closed arrangement at the end of the mounting cleat receiving portion 42 maintains the coupling due to gravity when the system 10 is mounted on a surface that is not horizontal. As previously described, a cleat cover plate 48 may be provided over the mounting cleat receiving portion 42 to hide the coupling members and provide a cleaner look to the mounted system 10. It is noted that a variety of different mounting configurations and interactions between mounting members and carrier boards are possible without departing from the scope of the present general inventive concept. For example, the upper portion of the mounting member may be formed in a host of different sizes and shapes, and may form only one groove on one side, or grooves on all four sides, or may be round with a continuous groove formed under a perimeter thereof, and so on. Various example embodiments may provide a mounting member and carrier board provided with an attachment material such as VELCRO® to hold the carrier board in place when mounted. Various example embodiments may provide an altogether differently configured mounting member, such as two or more resiliently operating mounting portions, such as hooks that are formed to be spring loaded or resiliently contorted, that click into place into and/or over a portion of the mounting member receiving portion to hold the carrier board in place. Such an example embodiment can provide a mounted carrier board that can be easily released by a user by simply pushing the hook portions in a direction to release the tension hold on the carrier board, and likewise the carrier board can be simply mounted by pushing the board into place to interact with the hooks.

Figure 8:
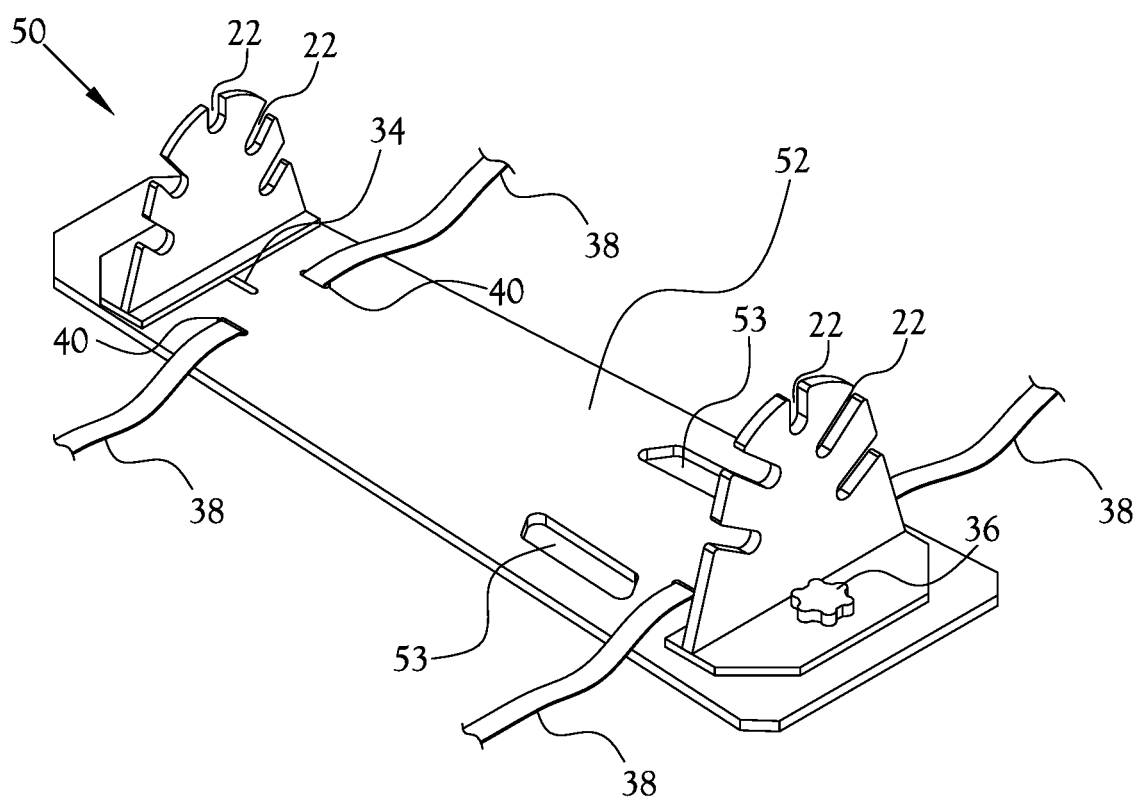
FIG. 8 illustrates a fishing rod docking system according to another example embodiment of the present general inventive concept.

FIG. 8 illustrates a fishing rod docking system according to another example embodiment of the present general inventive concept. The fishing rod docking system 50 of the example embodiment illustrated in FIG. 8 is substantially the same as the embodiment illustrated in FIG. 1, except that no mounting member receiving portion is provided in the carrier board 52, and therefore the system 50 is not designed to be mounted, or at least mounted in the same fashion. This allows a simpler carrier board 52 which may simply be place upon a surface to sit freely, or to be fixed by a strap or other securing device.

Figure 9:
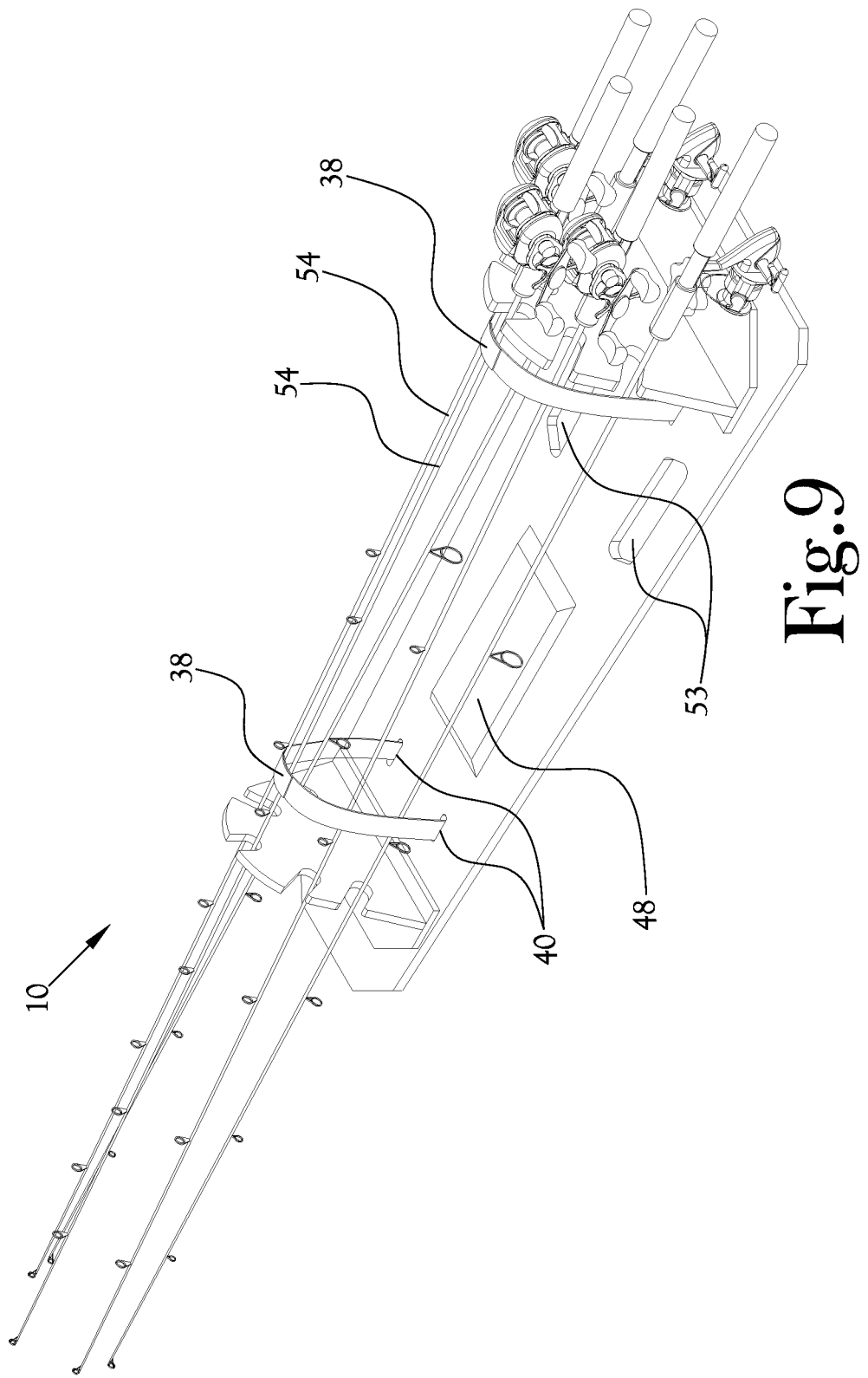
FIG. 9 illustrates the fishing rod docking system illustrated in FIG. 1 with a plurality of fishing rods stored thereon.

FIG. 9 illustrates the fishing rod docking system illustrated in FIG. 1 with a plurality of fishing rods stored thereon. As illustrated, a large number of fishing rods 54 may be docked in the fishing rod docking system 10 so as to be easily transported between desired locations. As this example embodiment includes receiving slots 22 that are not configured to provide secure fittings to the rods received therein, the straps 38 have been closed so as to provide enough tension to prevent the fishing rods from slipping out of the receiving slots due to gravitational or other forces applied in a direction away from the receiving slots 22.

Figure 10A:
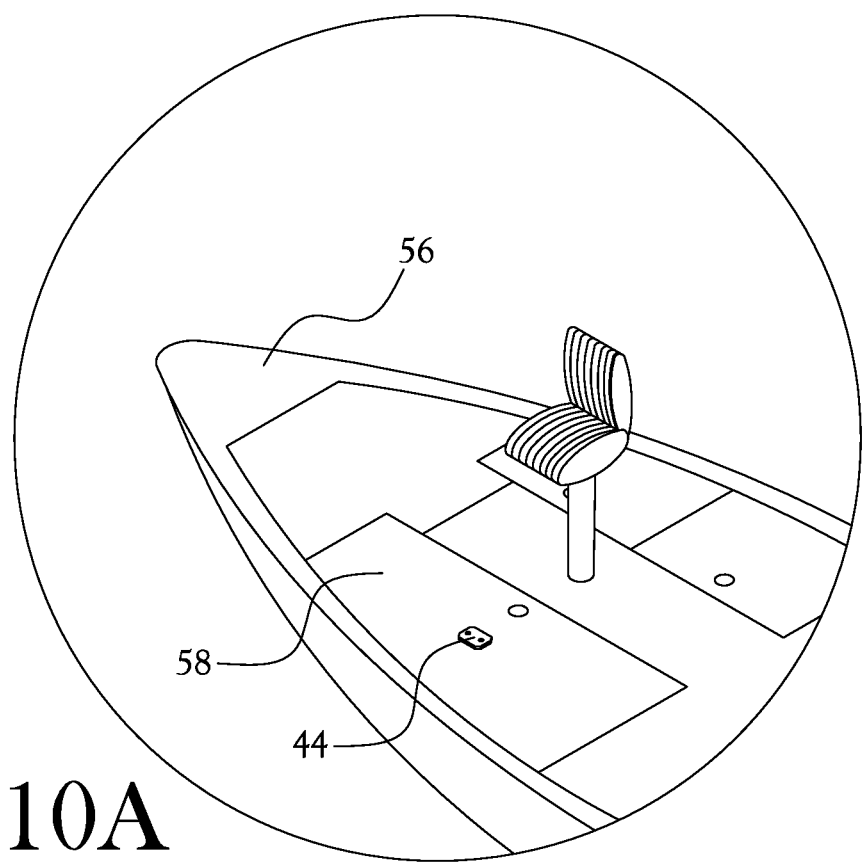
FIG. 10A illustrates a boat configured for the fishing rod docking system illustrated in FIG. 1.
Figure 10B:
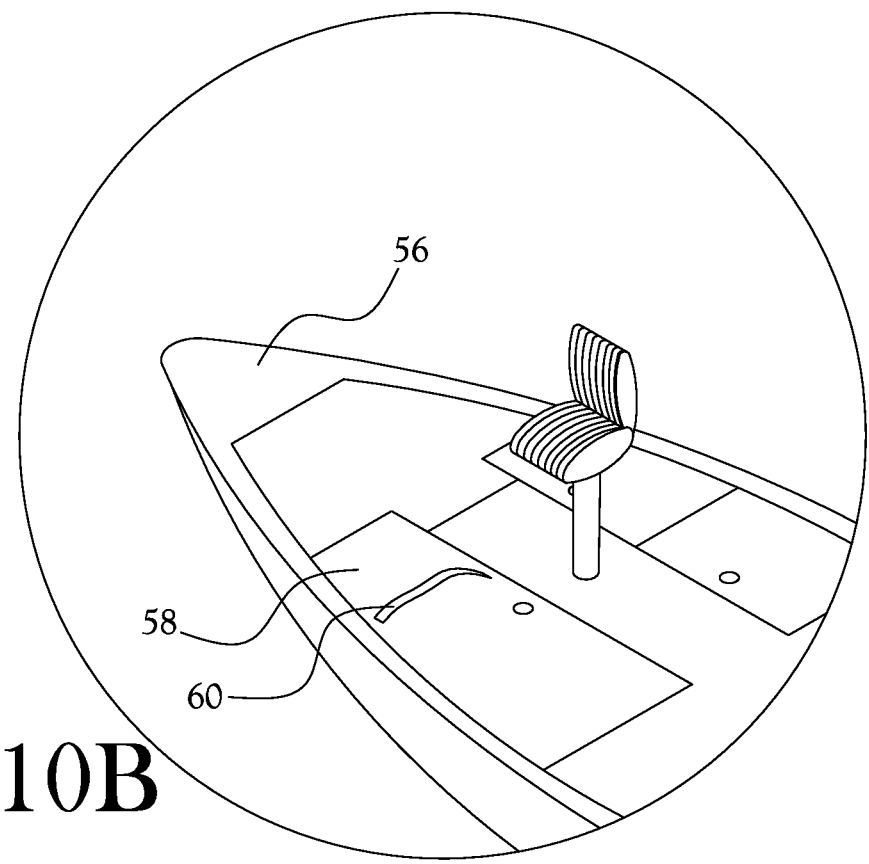
FIG. 10B illustrates a boat configured for the fishing rod docking system illustrated in FIG. 8, according to example embodiments of the present general inventive concept.
Figure 11:
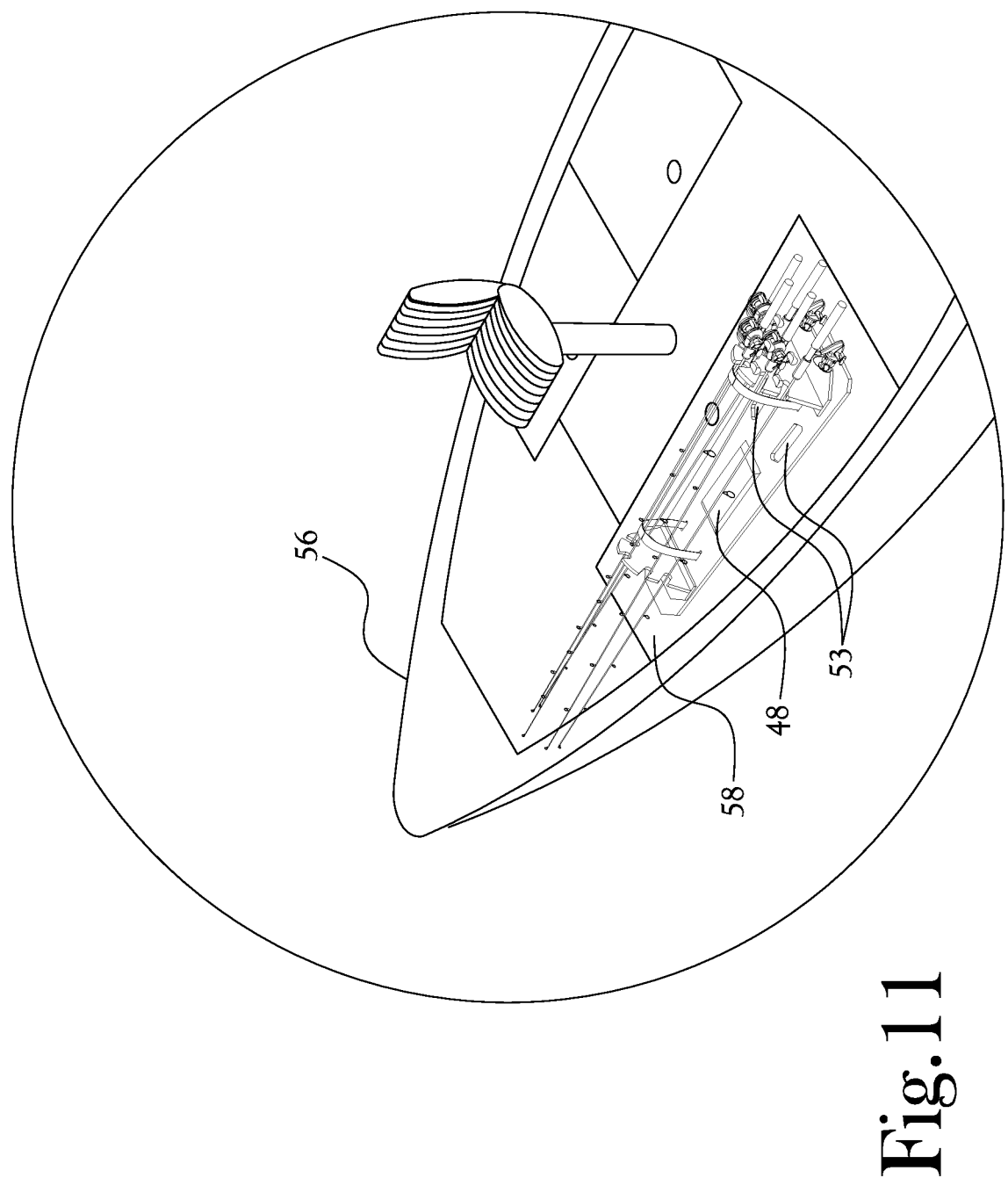
FIG. 11 illustrates the boat of FIG. 10A with the loaded fishing rod docking system of FIG. 9 mounted thereon.

FIG. 10A illustrates a boat configured for the fishing rod docking system illustrated in FIG. 1, and FIG. 10B illustrates a boat configured for the fishing rod docking system illustrated in FIG. 8, according to example embodiments of the present general inventive concept. As illustrated in FIG. 10A, a boat 56 has a section of deck 58 with the previously described mounting cleat 44 attached thereto. The mounting cleat 44 may be affixed to the deck 58 in a variety of ways, such as, for example, adhesive substances, screws, etc. The mounting cleat 44 of the example embodiment illustrated in FIG. 10A is configured without a base portion, which can provide for a more streamlined look, and the grooves which accept the flange 46 formed in the mounting member receiving portion 42 of the carrier board 12 are simply formed between the upper portion of the mounting cleat 44 and the deck of the boat. The mounting cleat 44 is relatively small, and therefore not an eyesore, and also not prone to obstructing other uses of the boat 56, when the fishing rod docking system 10 is not mounted on the mounting cleat 44. As illustrated in FIG. 10B, an attachment strap 60 has been attached to the boat deck 58 in lieu of the mounting cleat 44. Such an arrangement may be used with docking systems having or not having the mounting cleat receiving portion, as an alternative way of mounting the fishing rod docking system to the boat, since the attachment strap 60 can simply be wrapped around the docking system, or just the carrier board of the docking system. FIG. 11 illustrates the boat of FIG. 10A with the loaded fishing rod docking system of FIG. 9 mounted thereon.

Figure 12:
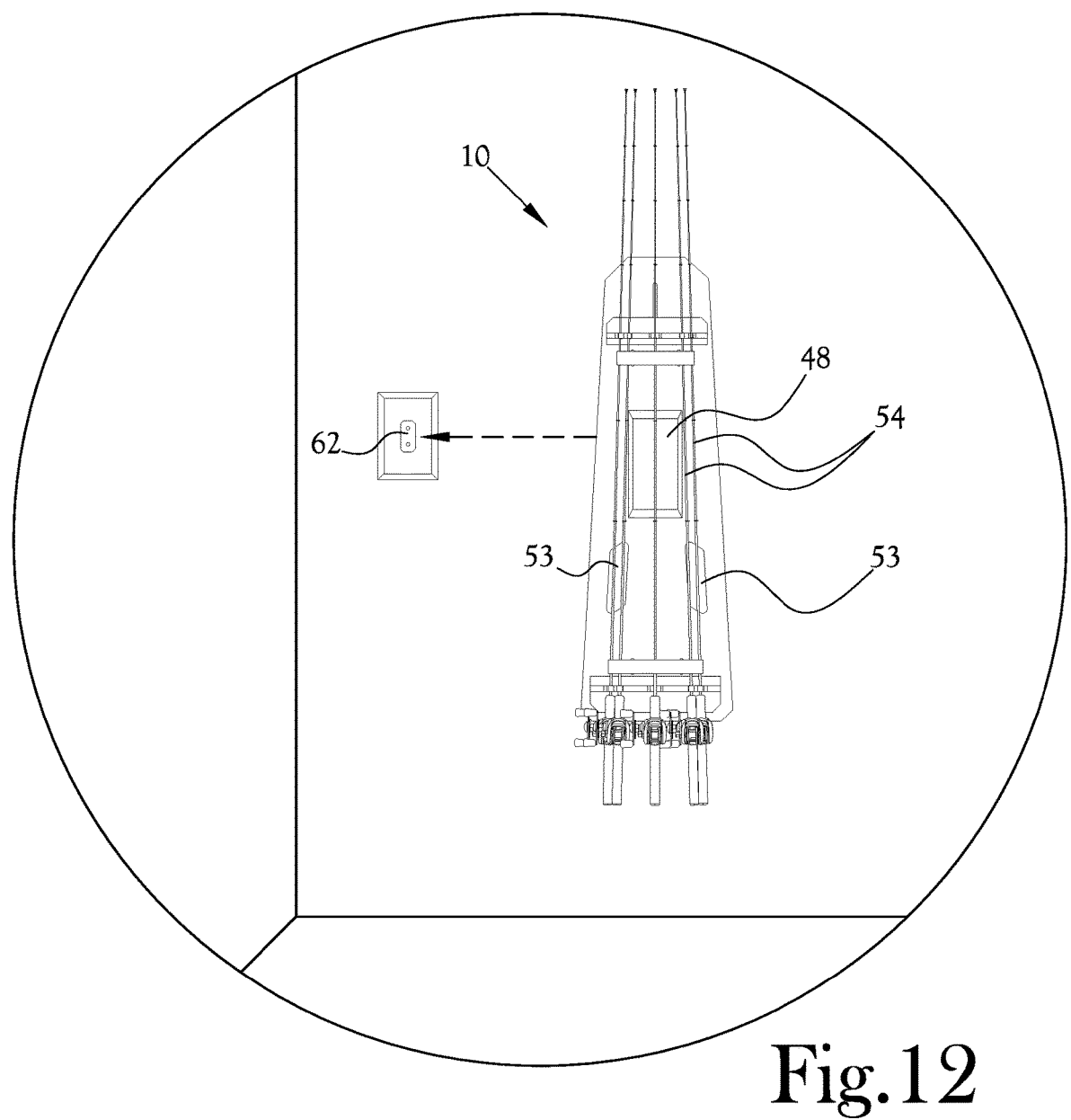
FIG. 12 illustrates a wall mount configuration for the loaded fishing rod docking system of FIG. 9 according to an example embodiment of the present general inventive concept.
Figure 13:
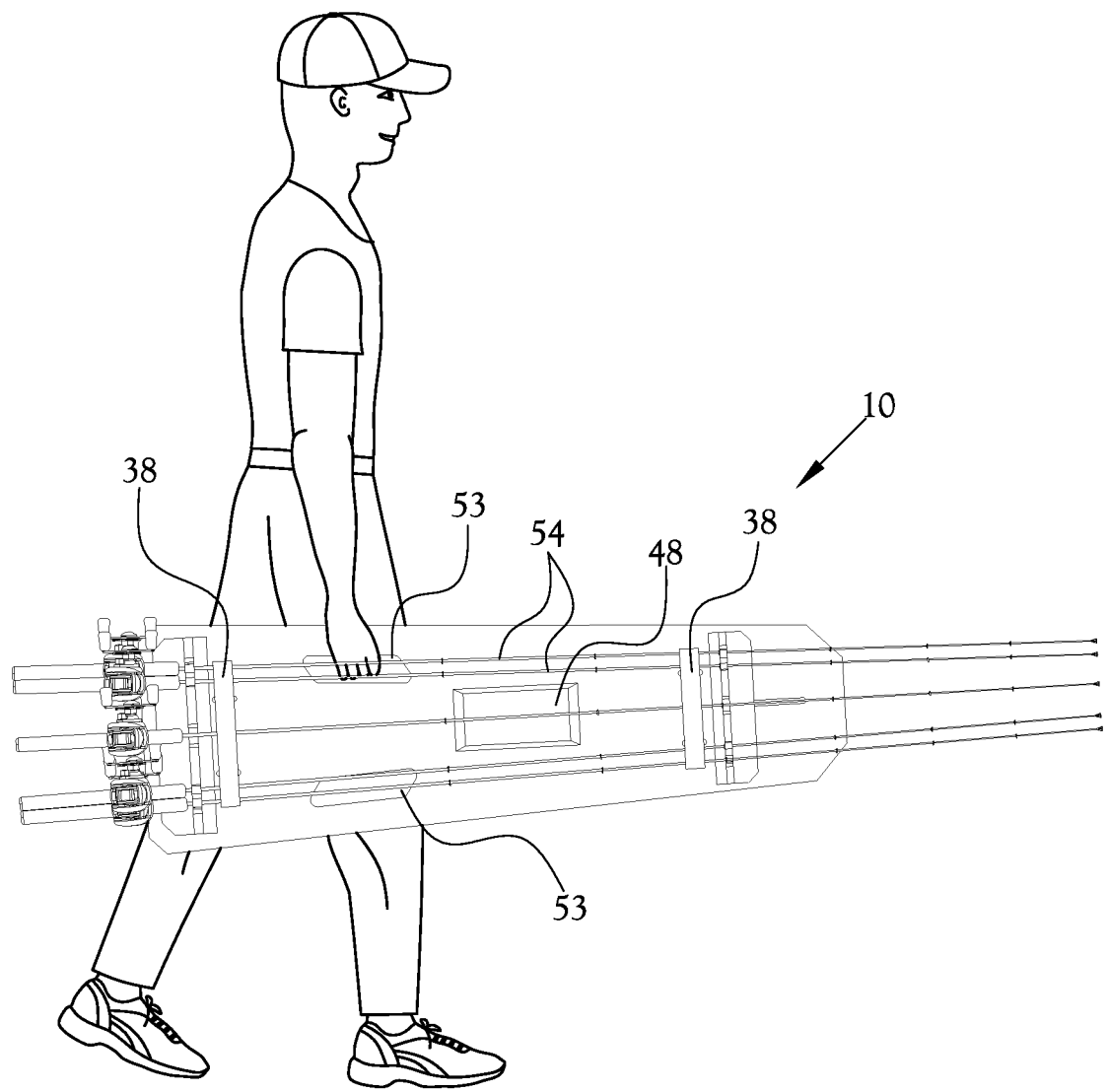
FIG. 13 illustrates a user transporting the loaded fishing rod docking system of FIG. 9.

FIG. 12 illustrates a wall mount configuration for the loaded fishing rod docking system of FIG. 9 according to an example embodiment of the present general inventive concept. As illustrated in this example embodiment, another mounting cleat 62 has been attached to a wall in the user's home, and the docking system 10 is mounted to the mounting cleat 62 in the same manner as previously illustrated in FIGS. 6A-7B. Thus, the user is able to mount the system 10 in a secure, simple, and aesthetically pleasing way when not using the fishing rods docked therein. FIG. 13 illustrates a user transporting the loaded fishing rod docking system 10 of FIG. 9. As illustrated, the user is able to easily transport the fishing rod docking system 10 by inserting his or her fingers through one of the carry handle cutouts 53 provided in the carrier board 12. In various example embodiments, fishing rod docking systems according to the present general inventive concept may be configured so as to fit inside a fishing rod locker. For example, the carrier board and rod holding plates may be sized to fit into a variety of differently configured rod lockers for even more secure transportation, such as when a user is traveling by plane or otherwise traveling over long distances.

Figure 14:
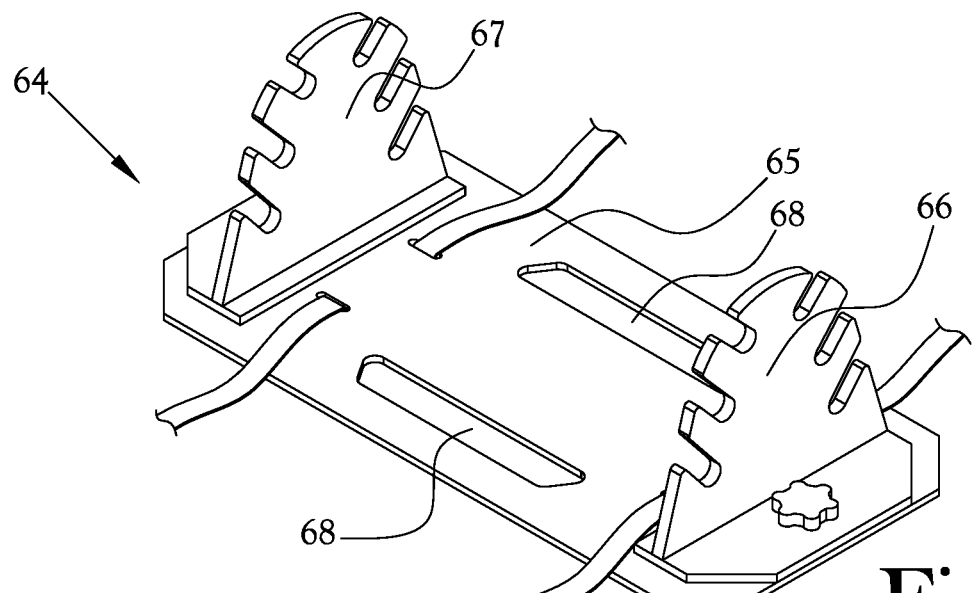
FIG. 14 illustrates a fishing rod docking system according to yet another example embodiment of the present general inventive concept.

FIG. 14 illustrates a fishing rod docking system according to yet another example embodiment of the present general inventive concept. In this example embodiment, a fishing rod docking system 64 includes a shorter carrier board 65 configured for smaller areas available to the user. Rear and front rod holding plates 66,67 have a fixed distance therebetween, and carry handle cutouts 68 are provided in a substantially centered location around the longitudinal axis of the carrier board 65. In this example embodiment, the rear and front rod holding plates 66,67 may be of the same size, as converging lines passing through corresponding pairs of receiving slots may not result in a useful arrangement when there is only a small distance between the rod holding plates 66,67.

Figure 15:
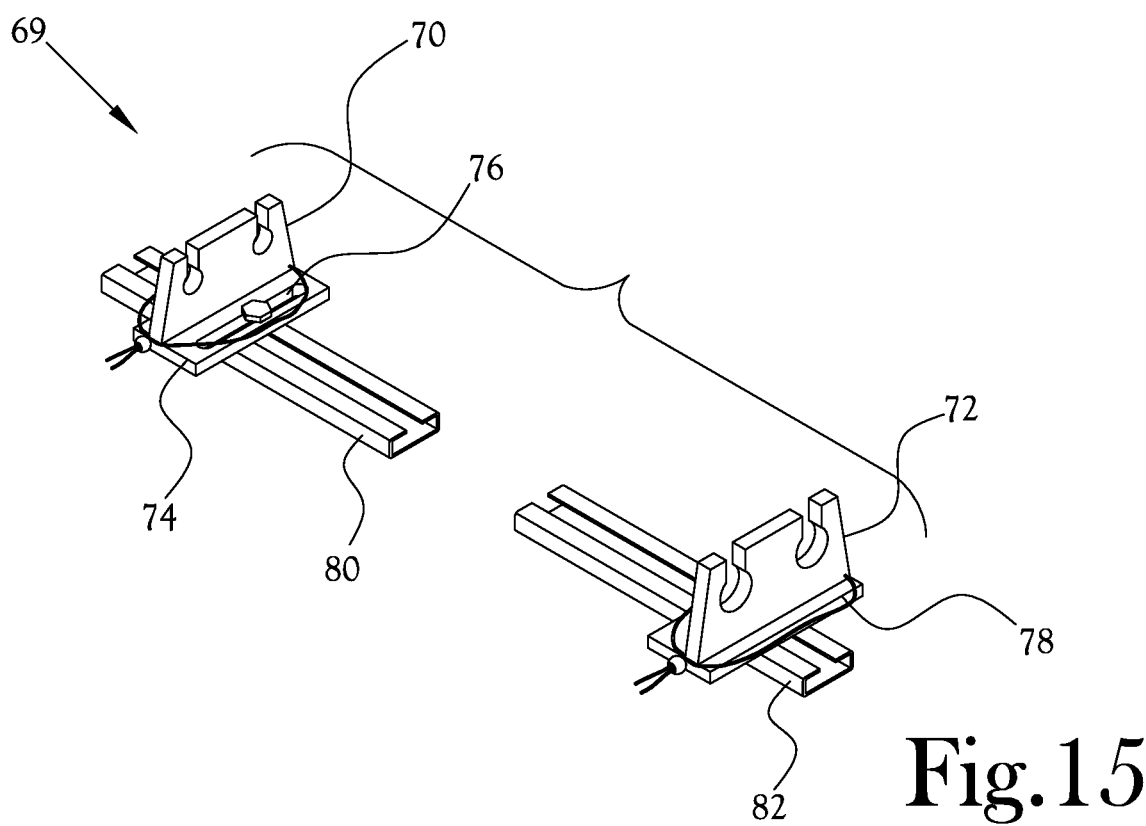
FIG. 15 illustrates a fishing rod docking system according to still another example embodiment of the present general inventive concept.
Figure 16:
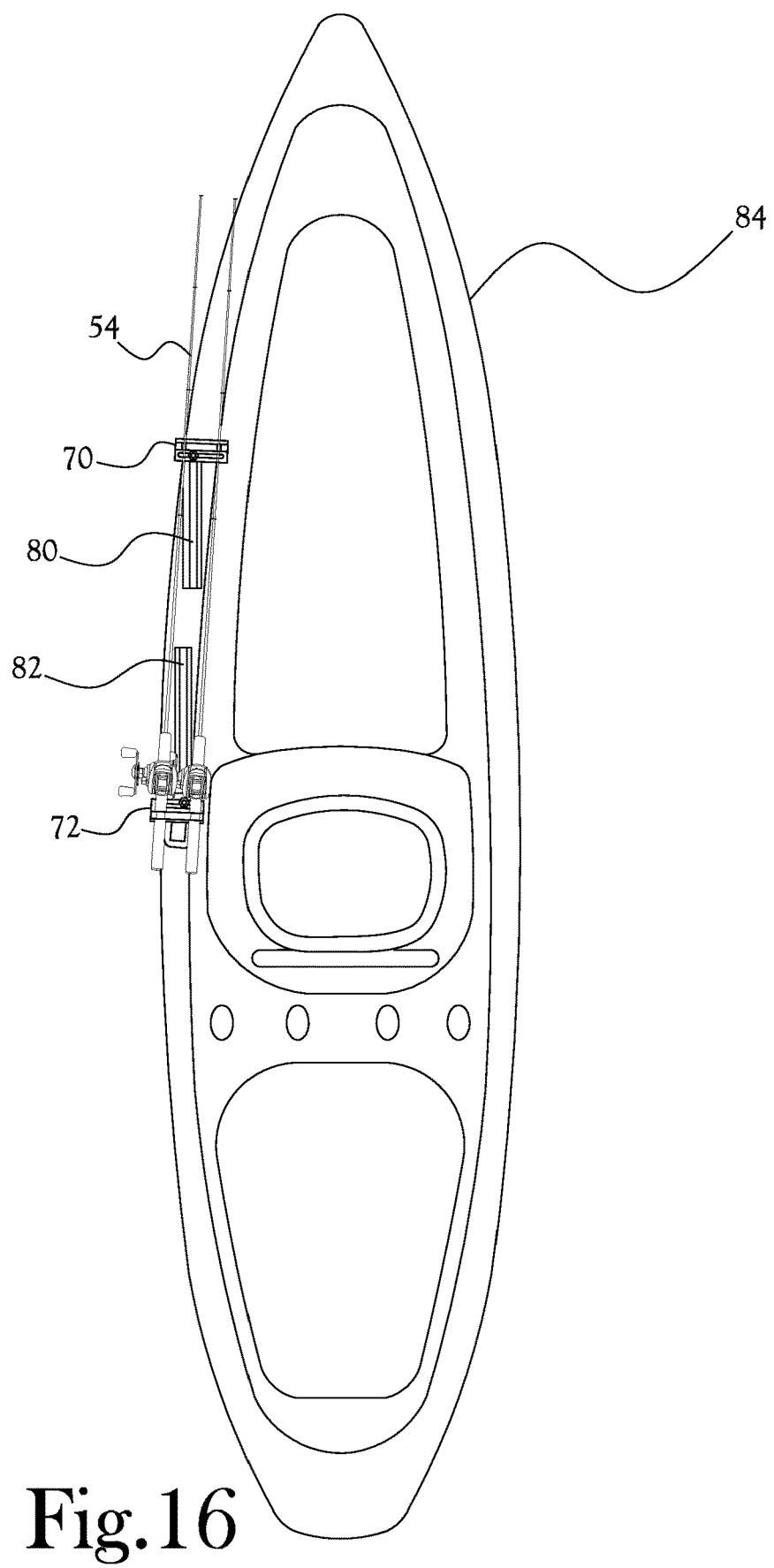
FIG. 16 illustrates a kayak having the fishing rod docking system illustrated in FIG. 15 mounted thereon.

FIG. 15 illustrates a fishing rod docking system according to still another example embodiment of the present general inventive concept. In this example embodiment, a fishing rod docking system 69 includes a front rod holding plate 70 and a rear rod holding plate 72 that are not coupled to a carrier board. Instead, the rod holding plates 70,72 are configured to be separately coupled to a desired surface. In the example embodiment illustrated in FIG. 15, the rod holding plates 70,72 are configured to be coupled to one or more slider track accessory rails, such as those typically installed on kayaks. While the example embodiment illustrated in FIG. 15 only includes two corresponding pairs of receiving slots to hold fishing rods therein, it is understood that different example embodiments may have more or fewer of the receiving slots. Also, while the receiving slots of this example embodiment are illustrated having narrow paths terminating in wider openings, so as to provide a more secure hold for the fishing rods received therein, various other example embodiments may have receiving slots with a host of different configurations. In this example embodiment, the front rod holding member or plate 70 extends upwardly from a front rod holding member base or support 74 that is formed to extend laterally from a lower portion of the front rod holding plate 70, and is configured to be coupled to a slider track accessory rail 80. The rear rod holding member or plate 72 extends upwardly from a rear rod holding member support 78 that is formed to extend laterally from a lower portion of the rear rod holding plate 72, and is configured to be coupled to a slider track accessory rail 82. In this example embodiment the front rod holding member base 74 is provided with an elongated through opening 76 that is configured to receive a securing member to couple the front rod holding member base 74 to the slider track accessory rail 80 so as to be selectively positionable in a direction away from a longitudinal axis of the slider track accessory rail 80. Thus, the front rod holding plate 70 can be positioned at different points along the longitudinal axis of the slider track accessory rail 80, as well as at different points away from the longitudinal axis of the slider track accessory rail 80. In various example embodiments, either or both of the rod holding plates 70,72 may be provided with such an elongated through opening in their bases for selectively positionable orientations. In other various example embodiments, the rod holding plates 70,72 may be configured to only be positionable along the longitudinal axis of the slider track accessory rails. In this example embodiment, each of the rod holding plates 70,72 is respectively provided with securing straps 81,83 to secure the rods in place in the receiving slots. The securing straps 81,83 may be coupled to the rod holding plates 70,72 in a variety of arrangements, and may be closed around the rods in a variety of ways. In the example embodiment illustrated in FIG. 15, the securing straps 81,83 each have two free ends that are secured in a friction fitting that allows the coupling of the free ends and an adjustment of the length of the straps. In various example embodiments of the present general inventive concept, a carrier board or other carrier member may be provided that is configured such that the rod holding plates 70,72 can be attached thereto for storage away from the kayak or other type of boat. In various example embodiments, such a carrier member may simply be a length of slider track accessory rail, so that the securing members (bolts, nuts, etc.) used to secure the rod holding plates 70,72 to the kayak accessory rails can also be used to secure the rod holding plates 70,72 to the carrier member. Such a carrier member may also be equipped with a mounting portion so that the coupled rod holding plates and carrier member may be mounted to a wall, vehicle, etc., in a convenient fashion for the user. FIG. 16 illustrates a kayak 84 equipped with the slider track accessory rails 80,82, and having the fishing rod docking system 69 illustrated in FIG. 15 mounted thereon.

According to various example embodiments of the present general inventive concept, a fishing rod docking system may embody a rod cradle. The rod cradle may include a carrier board extending from a front end to a rear end. The carrier board may have a centrally disposed cleat for facilitating mounting to a cleat or other such supporting structure used in a boat to fasten the system to the deck, or the same cleat can be mounted to a wall, vertical structure, horizontal structure, or upside down for storage or transportation other than in the boat, such as in a camper cover on a long bed truck. The cleat may act as a locking device. Each cleat may be accompanied by an operatively associated cleat cover. Adjacent each end of the system a rod plate and operatively associated rod plate support, respectively, may be attached so that the rod plates extend transversely relative to the carrier board. The rear and front plate support may be fastened to the carrier board with operative associated mounting knobs. The rear plate support may be used for setting/docking the rear of the rods in a cradle, and the front support be used in the same manner for the rod tips to keep them in an arrangement that allows minimum contact with the other fishing rods. This allows the rods to ride without interference from one another or other contact that could present a problem. The mounting knobs on the front of the rear and front plate enable a user to configure the best setup in the boat due to the trolling motor and electronics that most fisherman have in the front of their boats, allowing the rear plate/front plate to selectively swivel to make the "sweet spot" easy to obtain. The rod plates may come in different embodiments configured, for example, for baitcaster rods, open face rods, and/or a combination of both. The rod plates may be generally semi-circular, oblong, or have other shapes, and may provide radially extending member slots for slidably receiving the front or rear portion of elongated rods or other members as described above. Therefore, each member slot of the front rod plate operative aligns with a respective member slot of the rear rod plate.

In various example embodiments, the above-mentioned components may be made from materials of sufficient strength to be repeatedly subject to bending stresses without fracturing, and not adversely affected by sunlight/UV radiation, such as HDPE Plastic, marine grade. The sufficiently strong material can be machined by multiple methods, such as with woodworking tools, a CNC machine, laser, water jet, etc., and some or all of the components may be created by injection molding. It is understood that the components of various example embodiments of the present general inventive concept may be connected to each other by way of fasteners described herein, or by way of other fasteners known in the art used for fastening or removably securing one object to another. The front and rear hook and loop strapping, may be disposed adjacent each rod plate for adding a layer of stability and ease of mind while on the water and moving under power from an outboard or other type of motor. They also keep or fasten the fishing rods in the rod cradle for transportation or while wall mounted. A user may mount the rod cradle to one of many surfaces, allowing the user to manage the rods in a safe and organized manner. The rod cradle can be placed where the fisherman wants it as long as space allows. It can be removed from the boat and carrier to the residence and stored with ease. A user-fisherman, by way of example, may be on the road several months out of the year going from lake to lake weekly for different tournaments. They may live out of their trucks, hotels/ motels, and with an occasional friend or family member as they travel the country. As any professional, such a user may have a desire to go over his or her gear each evening and get it ready for the next day. The systems according to example embodiments of the present general inventive concept allow for that to be done much easier. For example, if a user wants to change out the different combinations that he presently has docked in the docking system, or to change lines or lures on the rods docked therein, the user can easily and readily remove the rod cradle or cradles from the boat or truck at one time, then make the adjustments, and even leave it in the room with them (retaining several thousands of dollars of equipment) with no concerns that they would normally have regarding the vehicle being broken into. Additionally, since the present general inventive concept provides a docking system designed to carry and store elongated members, various example embodiments can be adapted to carry guns, bows, and/or any other items that are similar in size and configuration.

Various example embodiments of the present general inventive concept provide a fishing rod docking system designed to store up to six or more fishing rods with fishing lures attached in a way that keeps them from being easily tangled with each other or stepped on. Each rod may be laid in the cradle so as to be readily accessible at a moment's notice. The docking system may have the rods strapped into position for ease of transportation, too, thus all of the docked rods can be moved at one time when moving on or off of the boat. The docking system also has a unique feature of being easily fastened or mounted to the boat or on the wall, vehicle, etc., for storage via a locking device built into the product.

Various example embodiments of the present general inventive concept may provide a fishing rod docking system including an elongated carrier member having a front end and a rear end, a rear rod holding member configured to be coupled to, and extend away from, a top surface of the carrier member proximate the rear end, and a front rod holding member configured to be coupled to, and extend away from, the top surface of the carrier member proximate the front end, wherein the rear and front rod holding members are each configured with a plurality of receiving slots such that each receiving slot provided on the rear rod holding member has a corresponding receiving slot provided on the front rod holding member, each pair of corresponding receiving slots configured to receive and hold a fishing rod extending therethrough. The plurality of receiving slots may be configured to provide a friction fit to a portion of a fishing rod received therein. At least a portion of the front and rear rod holding members forming the receiving slots may comprise a resiliently pliable material. The rear and front rod holding members may extend away from the carrier member in a direction substantially perpendicular to the carrier member. The fishing rod docking system may further include a rear rod holding member support configured to extend laterally from a bottom portion of the rear rod holding member and to be coupled to the carrier member such that the rear rod holding member is rotatable relative to the carrier member, and a front rod holding member support configured to extend laterally from a bottom portion of the front rod holding member and to be coupled to the carrier member such that the front rod holding member is rotatable relative to the carrier member. The fishing rod docking system may further include a rear fixing screw configured to be received through a through hole provided in the rear rod holding member support and into a correspondingly configured rear fixing screw recess provided proximate the rear end of the carrier member such that the rear rod holding member is selectively fixable at a desired rotation relative to the carrier member, and a front fixing screw configured to be received through a through hole provided in the front rod holding member support and into a correspondingly configured front fixing screw recess provided proximate the front end of the carrier member such that the front rod holding member is selectively fixable at a desired rotation relative to the carrier member. The rear fixing screw recess and/or the front fixing screw recess may be elongated along a longitudinal axis of the carrier member so that the rear rod holding member and/or the front rod holding member is selectively positionable along at least a portion of the longitudinal axis of the carrier member. The fishing rod docking system may further include one or more straps provided to the carrier member and configured to be wrapped around a plurality of fishing rods held in the front and rear rod holding members. The fishing rod docking system may further include a plurality of strap pathway openings provided in the carrier member for each of the one or more straps and configured such that the respective one or more straps are threaded through the strap pathway openings to be coupled to the carrier member. The fishing rod docking system may further include a mounting member configured to be fixed to a desired surface, and a mounting member receiving portion formed in the carrier member and configured to receive the mounting member to mount the carrier member thereon. The mounting member may be configured as a male coupling member, and the mounting member receiving portion may be configured a female coupling member. The mounting member and mounting member receiving portion may be configured as a tongue and groove fitting or a dovetail fitting, the mounting member receiving portion being configured to receive and slide over the mounting member to secure the carrier board in place. The mounting member may be configured as a cleat, and the mounting member receiving portion may be configured as a through opening formed in the carrier board and having tongue portions extending from at least a portion of a perimeter of the through opening to be received in indents of the cleat. The fishing rod docking system may further include a cleat cover plate fixed to the carrier board over the through opening to form a cleat pocket to hide the cleat and through opening when the carrier board is mounted to a surface. The fishing rod docking system may further include one or more carry handle cutouts configured as elongated through holes formed in the carrier member. The front rod holding member and rear rod holding member may be configured as plates having arcuate edges extending away from the carrier member, the receiving slots extending inward from the arcuate edges, and the front rod holding member may be smaller than the rear rod holding member and configured such that a plurality of fishing rods held by the front and rear rod holding members are arranged in converging directions moving forward from the front end of the carrier board.

Various example embodiments of the present general inventive concept may provide a fishing rod docking system including a rear rod holding member configured to be coupled to a slider track accessory rail, a front rod holding member configured to be coupled to the slider track accessory rail, wherein the rear and front rod holding members are each configured with a plurality of receiving slots such that each receiving slot provided on the rear rod holding member has a corresponding receiving slot provided on the front rod holding member, each pair of corresponding receiving slots configured to receive and hold a fishing rod extending therethrough when the rear and front rod holding members are positioned to face one another in a substantially parallel arrangement. The fishing rod docking system may further include a rear rod holding member base configured to extend laterally from a bottom portion of the rear rod holding member and to be coupled to the slider track accessory rail such that the rear rod holding member is rotatable relative to the slider track accessory rail, and a front rod holding member base configured to extend laterally from a bottom portion of the front rod holding member and to be coupled to the slider track accessory rail such that the front rod holding member is rotatable relative to the slider track accessory rail. At least one of the rear and front rod holding member bases may be configured with an elongated through opening to receive a securing member to couple the at least one of the rear and front rod holding member bases to the slider track accessory rail so as to be selectively positioned in a direction away from a longitudinal axis of the slider track accessory rail. The fishing rod docking system may further include a carrier member having a front coupling receiving portion to which the front rod holding member can be affixed to the carrier member with a securing member, and having a rear coupling receiving portion to which the rear rod holding member can be affixed to the carrier member with a securing member, the carrier member being configured to transport or store the front and rear rod holding members when not coupled to the slider track accessory rail.

Numerous variations, modifications, and additional embodiments are possible, and accordingly, all such variations, modifications, and embodiments are to be regarded as being within the spirit and scope of the present general inventive concept. For example, regardless of the content of any portion of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated.

It is noted that the simplified diagrams and drawings included in the present application do not illustrate all the various connections and assemblies of the various components, however, those skilled in the art will understand how to implement such connections and assemblies, based on the illustrated components, figures, and descriptions provided herein, using sound engineering judgment. Numerous variations, modification, and additional embodiments are possible, and, accordingly, all such variations, modifications, and embodiments are to be regarded as being within the spirit and scope of the present general inventive concept.

While the present general inventive concept has been illustrated by description of several example embodiments, and while the illustrative embodiments have been described in detail, it is not the intention of the applicant to restrict or in any way limit the scope of the general inventive concept to such descriptions and illustrations. Instead, the descriptions, drawings, and claims herein are to be regarded as illustrative in nature, and not as restrictive, and additional embodiments will readily appear to those skilled in the art upon reading the above description and drawings. Additional modifications will readily appear to those skilled in the art. Accordingly, departures may be made from such details without departing from the spirit or scope of applicant's general inventive concept.

The invention claimed is:

1. A fishing rod docking system, comprising:
   a planar elongated carrier board having a front end, a rear end, a rear fixing screw recess, a front fixing screw recess, and a mounting opening having a tongue therein;
   a cleat configured to be fixed to a boat deck, wherein the mounting opening is configured to receive the cleat there through to mount the carrier board to the boat deck with the carrier board being parallel to the boat deck;
   a rear rod holding member coupled to and extending substantially perpendicularly away from a top surface of the carrier board proximate the rear end; and
   a front rod holding member coupled to and extending substantially perpendicularly away from the top surface of the carrier board proximate the front end;
   wherein the rear and front rod holding members each have a plurality of receiving slots therein such that the receiving slots of the rear rod holding member align with the receiving slots of the front rod holding member to receive and hold fishing rods therethrough respectively to store the fishing rods on the carrier board with the fishing rods being parallel to the boat deck;
   wherein the rear rod holding member is fastened to the carrier board with a first fastener that is inserted within the rear fixing screw recess, wherein the rear rod holding member is rotatable relative to the carrier board;
   wherein the front rod holding member is fastened to the carrier board with a second fastener that is inserted within the front fixing screw recess, wherein the front rod holding member is rotatable relative to the carrier board;
   wherein the rear fixing screw recess is spaced apart and separate from the front fixing screw recess;
   wherein the rear fixing screw recess and/or the front fixing screw recess is an elongated slot extending along a longitudinal axis of the carrier board so that the position of the rear rod holding member and/or the front rod holding member is adjustable along at least a portion of the longitudinal axis of the carrier board to adjust a distance between the rear rod holding member and the front rod holding member.

2. The fishing rod docking system of claim 1, wherein the plurality of receiving slots are configured to provide a friction fit for each fishing rod received therein respectively.

3. The fishing rod docking system of claim 2, wherein at least a portion of the front and rear rod holding members each comprises a resiliently pliable material.

4. The fishing rod docking system of claim 1, further comprising:
   a rear rod holding member support configured to extend laterally from a bottom portion of the rear rod holding member the; and
   a front rod holding member support configured to extend laterally from a bottom portion of the front rod holding member.

5. The fishing rod docking system of claim 4, wherein the first fastener is a rear fixing screw received through a first through hole provided in the rear rod holding member support and into the rear fixing screw recess provided on the rear end of the carrier board such that the rear rod holding member is selectively fixable at a desired rotation relative to the carrier board; and
   wherein the second fastener is a front fixing screw configured to be received through a second through hole provided in the front rod holding member support and into the front fixing screw recess provided on the front end of the carrier board such that the front rod holding member is selectively fixable at a desired rotation relative to the carrier board.

6. The fishing rod docking system of claim 1, further comprising one or more straps provided on the carrier board, wherein the one or straps are each configured to be wrapped around a the fishing rods.

7. The fishing rod docking system of claim 6, further comprising a plurality of strap pathway openings provided in the carrier board for each of the one or more straps such that the one or more straps are each threaded through a corresponding strap pathway opening from said plurality of strap pathway openings to couple the one or more straps to the carrier board.

8. The fishing rod docking system of claim 1, wherein the cleat is a male coupling member; and the mounting opening is a female coupling member.

9. The fishing rod docking system of claim 8, wherein the mounting, the mounting opening is configured to slide over the cleat to secure the carrier board in place.

10. The fishing rod docking system of claim 1, wherein the tongue of the mounting opening is configured to be received in an indent of the cleat.

11. The fishing rod docking system of claim 10, further comprising a cleat cover plate fixed to the carrier board over the mounting opening to form a cleat pocket to hide the cleat and mounting opening when the carrier board is mounted to the boat deck.

12. The fishing rod docking system of claim 1, further comprising one or more carry handle cutouts formed as elongated through holes formed in the carrier board.

13. The fishing rod docking system of claim 1, wherein the front rod holding member and rear rod holding member are each plates having arcuate edges, the receiving slots extending inward from the arcuate edges respectively; and wherein the front rod holding member is smaller than the rear rod holding member.

* * * * *